United States Patent
Verbridge et al.

(10) Patent No.: US 12,017,641 B2
(45) Date of Patent: *Jun. 25, 2024

(54) SYSTEMS AND METHODS FOR CONTROLLING TORQUE INDUCED YAW IN A VEHICLE

(71) Applicant: RIVIAN IP HOLDINGS, LLC, Plymouth (CA)

(72) Inventors: Mason Verbridge, Canton, MI (US); Rahul Madineni, Farmington Hills, MI (US); Nachiket Vader, Irvine, CA (US); Bhushan Nagarajan, Huntington Beach, CA (US); Bhuvanesh Sainath, Irvine, CA (US)

(73) Assignee: RIVIAN IP HOLDINGS, LLC, Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,745

(22) Filed: Nov. 10, 2022

(65) Prior Publication Data

US 2023/0072013 A1    Mar. 9, 2023

Related U.S. Application Data

(63) Continuation of application No. 16/916,823, filed on Jun. 30, 2020, now Pat. No. 11,505,176.

(51) Int. Cl.
*B60W 30/02* (2012.01)
*B60W 30/08* (2012.01)
*B60W 40/114* (2012.01)

(52) U.S. Cl.
CPC ............ *B60W 30/02* (2013.01); *B60W 30/08* (2013.01); *B60W 40/114* (2013.01);
(Continued)

(58) Field of Classification Search
CPC .... B60W 30/02; B60W 30/08; B60W 40/114; B60W 2520/14; B60W 2520/16;
(Continued)

(56) References Cited

U.S. PATENT DOCUMENTS

| 5,258,912 A | 11/1993 | Ghoneim et al. |
| 8,428,840 B2 * | 4/2013 | O'Dea .................. B60T 8/1755 701/90 |

(Continued)

FOREIGN PATENT DOCUMENTS

| CA | 2553565 C | 1/2011 |
| CN | 101512477 A | 8/2009 |

(Continued)

OTHER PUBLICATIONS

CN-106314427-A Translation (Year: 2017).*

(Continued)

*Primary Examiner* — Jason Holloway
*Assistant Examiner* — Kyle T Johnson
(74) *Attorney, Agent, or Firm* — Haley Guiliano LLP

(57) ABSTRACT

Systems and methods are provided herein for operating a vehicle in a vehicle yaw mode. In response to initiating vehicle yaw mode, the system engages an open-loop mode, that provides open-loop forward torque to the outer wheels of the vehicle and open-loop backward torque to the inner wheels of the vehicle until a sufficient number of wheels are slipping. In response to determining that a sufficient number of wheels are slipping, engaging a closed-loop mode. While operating in the closed-loop mode, one or both of the wheel rotation and vehicle yaw rate are monitored to adjust the torques provided to the wheels of the vehicle to control the vehicle yaw rate.

20 Claims, 11 Drawing Sheets

(52) U.S. Cl.
CPC ..... *B60W 2520/14* (2013.01); *B60W 2520/16* (2013.01); *B60W 2520/26* (2013.01)

(58) Field of Classification Search
CPC ............ B60W 2520/26; B60W 10/08; B60W 2520/28; B60W 2552/15; B60W 30/18172; B60T 2210/22; B60T 8/1755; B62D 15/025; B62D 15/0265; Y02T 10/72

See application file for complete search history.

(56) References Cited

U.S. PATENT DOCUMENTS

| | | | | |
|---|---|---|---|---|
| 10,919,463 | B1* | 2/2021 | Brown | H04L 12/40013 |
| 11,505,176 | B2* | 11/2022 | Verbridge | B60W 30/02 |
| 2006/0015231 | A1* | 1/2006 | Yoshimura | B60L 3/0076 |
| | | | | 701/1 |
| 2007/0021875 | A1 | 1/2007 | Naik et al. | |
| 2007/0265758 | A1* | 11/2007 | Miura | B60W 40/112 |
| | | | | 701/72 |
| 2009/0051216 | A1* | 2/2009 | Maeda | B60W 30/02 |
| | | | | 303/146 |
| 2011/0276207 | A1 | 11/2011 | Falkenstein | |
| 2014/0145498 | A1* | 5/2014 | Yamakado | B60W 10/08 |
| | | | | 303/3 |
| 2015/0105978 | A1* | 4/2015 | Nakatsu | B60L 7/00 |
| | | | | 701/37 |
| 2017/0166203 | A1* | 6/2017 | Sugai | B60W 10/184 |
| 2019/0143812 | A1* | 5/2019 | Fuchs | A01C 15/003 |
| | | | | 701/50 |
| 2020/0094797 | A1* | 3/2020 | Shoji | B60W 40/076 |
| 2020/0148255 | A1 | 5/2020 | Korsch et al. | |
| 2020/0307607 | A1* | 10/2020 | Noma | B60W 40/068 |
| 2021/0061283 | A1* | 3/2021 | Hudson | B62D 7/14 |
| 2021/0197820 | A1* | 7/2021 | Keller | B60K 1/02 |
| 2021/0221378 | A1* | 7/2021 | Jung | B60W 40/076 |
| 2021/0261102 | A1* | 8/2021 | Sato | B60T 7/12 |
| 2021/0402982 | A1* | 12/2021 | Verbridge | B60W 30/18172 |

FOREIGN PATENT DOCUMENTS

| | | | | |
|---|---|---|---|---|
| CN | 104773176 | A | | 7/2015 |
| CN | 106314427 | A * | 1/2017 | ............ B60W 10/08 |
| CN | 107490968 | A | | 12/2017 |
| CN | 108382271 | A | | 8/2018 |
| CN | 109747434 | A | | 5/2019 |
| CN | 109941248 | A | | 6/2019 |
| CN | 110944867 | A | | 3/2020 |
| CN | 111086400 | A | | 5/2020 |
| CN | 111108035 | A | | 5/2020 |
| DE | 112016003017 | T5 | | 3/2018 |
| WO | 2017/008700 | A1 | | 1/2017 |
| WO | 2018/177718 | A1 | | 10/2018 |

OTHER PUBLICATIONS

2021 GMC Yukon Has Rivian Like Hurricane Turn Spin (Year: 2020).
CN-104773176-A translation (Year: 2015).
CN-108382271-A translation (Year: 2018).
DE-112016003017-T5 translation (Year: 2018).
Electric Car Dream Progress Otago Daily Times (Year: 2013).
European Search Report of EP Application 21180652.6 dated Oct. 28, 2021.
Study of Zero Turn Vehicles (Year: 2016).
WO-2018177718-A1 (Year: 2018).

* cited by examiner

SYSTEMS AND METHODS FOR CONTROLLING TORQUE INDUCED YAW IN A VEHICLE

CROSS-REFERENCE TO RELATED APPLICATION(S)

This application is a continuation of U.S. patent application Ser. No. 16/916,823, filed on Jun. 30, 2020. This disclosure of which is hereby incorporated by reference herein in its entirety.

INTRODUCTION

In a conventional vehicle, performing vehicle yaw is not possible simply because conventional vehicles do not possess the ability to control torque direction and slippage of each of the vehicle's wheels. To initiate wheel slippage in a conventional vehicle, the driver generally applies torque to at least two wheels (e.g., in response to the user pressing an accelerator pedal). However, such application of torque is generally not controlled and does not provide a control for initiating and maintaining slippage of the wheels. Further, such slippage would generally cause only two wheels to slip (e.g., front wheels in a front wheel drive vehicle, or rear wheels in a rear wheel drive vehicle). Such wheels would slip in the same directions (e.g., both front wheels slipping with forward torque or rear wheels slipping with forward torque). In a conventional vehicle with four wheel drive, the wheels would slip in the same direction (e.g., both front wheels and rear wheels slipping with forward torque). Such wheel slippage does not allow for producing vehicle yaw of the vehicle. Consequently, what is needed is an improved turning capability that enables vehicle yaw with controlled torque at each wheel.

SUMMARY

In accordance with the present disclosure, systems and methods are provided that improve the operation of a vehicle by controlling torque induced vehicle yaw in the vehicle to allow the vehicle to pivot, for example, around a point under the chassis of the vehicle. For example, a method may utilize improved features of a vehicle (e.g., independent control of front and back drive shafts, independent control of the wheels, independent control of the brakes, etc.) to provide a vehicle with a capability of performing turns around a point under the chassis of the vehicle. A vehicle yaw can be performed in any vehicle capable of distributing torque and/or braking to the wheels of the vehicle.

In some implementations, techniques described below may be performed by processing circuitry of a vehicle. The processing circuitry may be implemented as a part of a vehicle. In some embodiments, the processing circuitry may comprise an on-board vehicle computer that can control multiple features or capabilities of the vehicle. In some embodiments, the processing circuitry may be communicatively connected with user inputs of the vehicle, sensors of the vehicle, and transitory or non-transitory memory (e.g., memory-storing institutions for operating the vehicle).

In some embodiments, a method for controlling torque induced vehicle yaw in a vehicle is provided. For example, the processing circuitry may engage the vehicle yaw mode of the vehicle under certain circumstances. In some embodiments, the processing circuitry may engage the vehicle yaw mode after the user issues a command requesting such mode (e.g., by pressing an appropriate button, turning the steering wheel to a certain point, or via any other input).

In some embodiments, the processing circuitry may engage the vehicle yaw mode after a number of criteria checks are performed (e.g., wheel alignment, drive mode, vehicle speed, periphery checks, geo-fencing, vehicle health, etc.). For example, the processing circuitry may determine that the vehicle is stationary with all the wheels straight. In some embodiments, the vehicle yaw mode may only be activated when all wheels of the vehicle are straight (e.g., aligned to be parallel to the length of the vehicle). In some embodiments, in response to initiating the vehicle yaw mode, the vehicle may cause the wheels of the vehicle to automatically straighten the wheels. In some embodiments, when the criteria checks are met, the processing circuitry may initiate the vehicle yaw mode.

In some embodiments, in response to initiating the vehicle yaw mode, the processing circuitry engages an open-loop mode. The open-loop mode performs the vehicle yaw mode without adjusting the output variables, (e.g., output of torque is not adjusted based on a sensor, rather torque is ramped up to or set to a specific amount based on a set amount or user input). For example, the torque applied to the inner wheels and outer wheels is ramped up to 4000 Newton meters (Nm). In some embodiments, ramping the open-loop forward torque and open-loop backward torque includes gradually increasing the torque. In some embodiments, the torque is increased incrementally in a stepwise pattern up to 4000 Nm. While operating in open-loop mode, the processing circuitry may provide an open-loop forward torque to outer wheels of the vehicle. In some embodiments, open-loop forward torque may be provided in proportion to the user input (e.g., proportionally to how far the user has pressed the accelerator pedal). In some embodiments, the processing circuitry may also provide an open-loop backward torque to inner wheels of the vehicle. For example, the processing circuitry may concurrently provide open-loop forward torque to the outer wheels of the vehicle and provide open-loop backward torque to the inner wheels of the vehicle. In some embodiments, the processing circuitry may monitor each wheel of the outer wheels and each wheel of the inner wheels for slippage. For example, the processing circuitry may monitor the slippage of the wheels as the torque to each wheel increases. In some embodiments, the processing circuitry may, in response to determining a sufficient number of wheels of the vehicle are slipping, engage a closed-loop mode. A sufficient number of wheels of the vehicle slipping may be two wheels, three wheels or four wheels. In some embodiments, two wheels slipping are sufficient if they are diagonal to each other (e.g., front outer wheel and rear inner wheel). In some embodiments, as a result of operating in the open-loop mode, the vehicle will initiate the vehicle yaw with a significantly reduced turn radius and faster. In some embodiments, as a result of operating in the open-loop mode, the vehicle will perform a vehicle yaw by starting to pivot around a point under the chassis of the vehicle.

In some embodiments, the processing circuitry, when engaging the closed-loop mode, may monitor the rotation of each of the wheels. For example, sensors at each wheel may provide data relating to the rotation of each wheel. In some embodiments, the processing circuitry may also monitor a vehicle yaw rate of the vehicle. For example, one or more sensors distributed around the vehicle may monitor the rate of yaw of the vehicle. In some embodiments, the vehicle may provide torque to each wheel to maintain slippage of each of the wheel as the vehicle rotates (yaws) about a substantially static location. The substantially static location may be a point under the chassis of the vehicle.

In another example, the processing circuitry may concurrently monitor the rotation of each of the wheels and the rate of yaw of the vehicle. In some embodiments, while operating in the closed-loop mode, the processing circuitry may adjust forward torque to each wheel of the outer wheels and backward torque to each wheel of the inner wheels, based on each wheel's respective rotation and the vehicle yaw rate. For example, when the vehicle's rate of yaw falls below a specific range (e.g., a range of a vehicle revolution between 8 and 10 seconds, a range of a vehicle revolution between 6 and 8 seconds, etc.) the processing circuitry may alter the torque at each wheel to increase the vehicle yaw rate. Specifically, the processes circuitry may increase the torque to one side of the vehicle, to one wheel of the vehicle, or to all the wheels. Alternatively, as the vehicle's rate of yaw goes above a specific range, that is, the vehicle's rotations is too fast, the processing circuitry may alter the torque at each wheel to reduce vehicle yaw rate. For example, the processing circuitry, in response to determining that the vehicle yaw rate is too high, may apply a brake to one of the wheels to reduce the rotation, or may reduce the torque to each wheel to gradually reduce the rate of yaw of the vehicle.

In some embodiments, the processing circuitry may further monitor an incline of the vehicle based on a tilt sensor. For example, the vehicle may be in an incline position, a banked position, or a combination thereof. In some embodiments, the inclined position includes front wheels of the vehicle being in a higher position than rear wheels or the rear wheels of the vehicle being in the higher position than the front wheels. For example, the vehicle being on a hill with a front of the vehicle being higher than a rear of the vehicle. Alternatively, the vehicle may be on the incline, with the rear of the vehicle being higher than the front of the vehicle. In some embodiments, the banked position includes outer wheels of the vehicle being in the higher position than the inner wheels or the inner wheels of the vehicle being in the higher position than the outer wheel. For example, the vehicle being on a hill sideways, with an inner side of the vehicle being higher than the outer side of the vehicle. Alternatively, with an outer side of the vehicle being higher that the inner side of the vehicle. In some embodiments, the processing circuitry may compare the incline of the vehicle against a vehicle incline threshold (e.g., 10% incline grade, 8% incline grade, etc.). The processing circuitry, in response to determining that the vehicle incline is below the vehicle incline threshold, may initiate the vehicle yaw mode.

In some embodiments, the processing circuitry, when operating in an open-loop mode and in response to determining that the vehicle is in the inclined position, may provide higher forward torques to wheels rotating forward on the inclined surface than backward torques to wheels rotating backward on the inclined surface. For example, as the vehicle is on a hill with the front of the vehicle higher than the back of the vehicle, to prevent the vehicle from rolling down the hill, the processing circuitry provides higher forward torque up the hill than backward torque down the hill. In some embodiments, the processing circuitry may monitor the incline of the vehicle continuously. As the vehicle pivots around a point under the chassis of the vehicle, the vehicle's incline changes from inclined position to banked position. In some embodiments, when operating in the banked position, the processing circuitry provides increase forward torques to wheels in the higher position of the banked surface than the backward torques to wheels in a lower position of the banked surface. For example, as the vehicle is on a hill with the outer side of the vehicle being higher than the inner side of the vehicle, the processing circuitry provides higher forward torque to the wheels at the outer side of the vehicle than the backward torque to the wheels at the inner side of the vehicle.

In some embodiments, the processing circuitry, when operating in an incline position, the higher forward torques may cause forward force components to be exerted on each wheel by a ground of the wheels rotating forward on the inclined surface. For example, the forward force components may include forward force components at one side of the vehicle, including at the front outer wheel and the rear outer wheel. According to another example, the backward torques cause rearward force components to be exerted on each wheel by the ground of the wheels rotating backward on the inclined surface. In some embodiments, when the incline of the vehicle is relatively low, (e.g., 1% incline grade) a sum of the forward force components is substantially equal to a sum of the rearward force components with the end result causing the vehicle to rotate about a point under the chassis of the vehicle. In some embodiments, when the incline of the vehicle is greater than 1% incline grade, the vehicle exhibits sufficient gravitational force components to cause the vehicle to move down the hill when yawing. Accordingly, the processing circuitry adjusts the torque to each of the wheels to counter the gravitational force components. The gravitational force components are applied at each wheel and the forward force components are adjusted higher, while the backward force components are adjusted lower to counteract the gravitational force components. In some embodiments, a sum of the forward force components (e.g., forward force components at the front outer wheel and rear outer wheel) is greater than a sum of the rearward force components (e.g., rearward force components at the front inner wheel and rear inner wheel) by a sum of the gravitational force components. According to an implementation of this embodiment, the combinations of the forces cause the vehicle to rotate (vehicle yaw) about a point under the chassis of the vehicle.

In some embodiments, the processing circuitry, when operating in an open-loop mode and in response to determining that the vehicle is in the banked position, may provide higher forward torques to wheels being in the higher position than backward torques to wheels in the lower position. For example, as the vehicle is on a hill with the outer side of the vehicle being higher than the inner side of the vehicle, the processing circuitry provides higher forward torques to the wheels at the outer side of the vehicle than the backward torque to the wheels at the inner side of the vehicle. In some embodiments, the processing circuitry may monitor the incline of the vehicle continuously. As the vehicle pivots around a point under the chassis of the vehicle, the vehicle's incline changes from banked position to inclined position. For example, as the vehicle is on a hill with the front of the vehicle higher than the back of the vehicle, to prevent the vehicle from rolling down the hill, the processing circuitry provides higher forward torque up the hill than backward torque down the hill.

In some embodiments, the processing circuitry, when operating in a banked position, with the outer wheels in the higher position, the torque applied to each wheel of the outer wheels is higher than the torque applied to each wheel of the inner wheel. For example, the forward torque may cause forward force components to be exerted on each wheel by the ground of the wheels being in the higher position. For example, the forward force components may include forward force components at one side of the vehicle, including at the front outer wheel and the rear outer wheel. The backward torques cause rearward force components to be exerted on each wheel by the ground of the wheels in the lower position. In some embodiments, when the incline of the vehicle is greater than 1% incline grade, the vehicle also exhibits gravitational force components that act as lateral force components on the vehicle. In some embodiments, the processing circuitry adjusts the torque applied to each of the wheels to counter gravitational forces components. In some embodiments, a sum of the forward force components (e.g., forward force component at the front outer wheel and rear outer wheel) is higher than a sum of the rearward force components (e.g., rearward force component at the front inner wheel and rear inner wheel). According to an implementation of this embodiment, the combinations of the forces cause the vehicle to rotate (vehicle yaw) about a point under the chassis of the vehicle.

In some embodiments, the processing circuitry, when providing open-loop forward torque to the outer wheels, may provide forward torque to an outer front wheel of the vehicle and an outer rear wheel of the vehicle. For example, the processing circuitry may concurrently provide forward torques to the outer front wheel and the outer rear wheel of the vehicle. In some embodiments, forward torque may be provided in proportion to the user input (e.g., proportionally to how far the user has pressed the accelerator pedal). In some embodiments, while operating in the vehicle yaw mode, the outer wheels of the vehicle may slip relative to the ground.

In some embodiments, the processing circuitry, when providing open-loop backward torque to the inner wheels of the vehicle, may provide backward torque to an inner front wheel of the vehicle and an inner rear wheel of the vehicle. For example, the processing circuitry may concurrently provide backward torques to the inner front wheel and the inner rear wheel of the vehicle. In some embodiments, rearward torque may be provided in proportion to the user input (e.g., proportionally to how far the user has pressed the accelerator pedal). In some embodiments, while operating in the vehicle yaw mode, the inner wheels of the vehicle may slip relative to the ground.

In some embodiments, the processing circuitry may monitor rotation of each of the wheels of the vehicle. For example, the processing circuitry may monitor the rotation of the inner front wheel, rotation of the inner rear wheel, rotation of the outer rear wheel and rotation of the outer front wheel as all of the wheels slip relative to the ground. In some embodiments, while operating in closed-loop mode, the processing circuitry may control the forward torque of the outer wheels such that the rotation of the outer front wheel is approximately equal to the rotation of the outer rear wheel. For example, the processing circuitry, in response to determining that the rotation of the outer front wheel is not approximately equal to the rotation of the outer rear wheel, may control the rotation of each of the outer wheels such that the rotation of the outer front wheel is approximately equal to the rotation of the outer rear wheel. In some embodiments, the processing circuitry may apply a brake to one or both the outer wheels. In some embodiments, the processing circuitry may reduce forward torque to one or both of the outer wheels.

In some embodiments, the processing circuitry may compare the rotation of the inner front wheel, rotation of the inner rear wheel, rotation of the outer rear wheel, and the rotation of the outer front wheel to a target spin rate (e.g., 4 revolutions per second spin rate or any other spin rate). For example, the processing circuitry may control the rotation of the inner front wheel, rotation of the inner rear wheel, rotation of the outer rear wheel, and the rotation of the outer front wheel based on the comparison to the target spin rate. In some embodiments, while operating in the closed-loop mode, the processing circuitry may control the forward torque of the outer wheels and the backward torque of the inner wheels such that the rotation of the inner front wheel, rotation of the inner rear wheel, rotation of the outer rear wheel, and the rotation of the outer front wheel do not exceed the target spin rate. For example, the processing circuitry, in response to determining that the rotation of the inner front wheel, rotation of the inner rear wheel, rotation of the outer rear wheel, or the rotation of the outer front wheel is above the target spin rate, may adjust forward torque to the outer wheels or backward torque to the inner wheels of the vehicle based on the determination to prevent wheel and drivetrain wear. In some embodiments, the processing circuitry may apply a brake to one or more of the outer wheels and the inner wheels. In some embodiments, the processing circuitry may reduce forward torque to one or more of the outer wheels or backward torque to the inner wheels.

In some embodiments, the processing circuitry may monitor the vehicle yaw rate. For example, the processing circuitry may receive rotation information of the vehicle from at least one sensor. In some embodiments, the processing circuitry may compare the vehicle yaw rate to a target vehicle yaw rate (e.g., a vehicle revolution per 10 seconds or any other yaw rate). For example, the processing circuitry may control the rotation of the inner front wheel, rotation of the inner rear wheel, rotation of the outer rear wheel, and the rotation of the outer front wheel based on the comparison to the target vehicle yaw rate.

In some embodiments, forward torque is provided to the outer wheels by a first motor configured to transmit torque to an outer front wheel and a second motor configured to transmit torque to an outer rear wheel. In some embodiments, backward torque is provided to the inner wheels by a third motor configured to transmit torque to an inner front wheel and a fourth motor configured to transmit torque to an inner rear wheel.

In some embodiments, the processing circuitry may be configured to disengage the vehicle yaw mode. For example, the processing circuitry may determine that an obstruction may exist, or any other criteria are not satisfied. In some embodiments, when the determination is made, the processing circuitry may automatically disengage the vehicle yaw mode. In some embodiments, the processing circuitry may disengage the vehicle yaw mode in response to receiving user input (e.g., a key being pressed, or the steering wheel being turned to a position that exceeds a threshold).

According to another embodiment, a vehicle configured for turning in a vehicle yaw mode is provided. In some embodiments, the vehicle may be configured to include front wheels, rear wheels and each wheel of the front wheels and rear wheels being configured with a motor to provide torque to each respective wheel.

In some embodiments, the vehicle may also be configured to include circuitry. In some embodiments, the circuitry may be configured to engage a vehicle yaw mode in response to receiving an input from a user. In some embodiments, while operating in the vehicle yaw mode, the processing circuitry may provide open-loop forward torque to outer wheels of the vehicle using a motor associated with each wheel and provide an open-loop backward torque to inner wheels of the vehicle using a motor associated with each wheel.

In some embodiments, each wheel configured with a motor comprises a first motor configured to transmit torque to an outer front wheel, a second motor configured to transmit torque to an inner front wheel, a third motor configured to transmit torque to an outer rear wheel and a fourth motor configured to transmit torque to an inner rear wheel.

In some embodiments, a non-transitory computer-readable medium having instructions encoded thereon for turning a vehicle in a yaw mode is provided. In some embodiments, the encoded instructions may be executed by processing circuitry of a vehicle having front wheels and rear wheels. In some embodiments, the processing circuitry is configured to engage a yaw mode when turning the steering wheel to a certain point, or via any other input. According to some embodiments, while operating in the yaw mode, the processing circuitry based on the encoded instructions, may cause forward torque to be applied to the outer wheels of the vehicle and cause backward torque to be applied to the inner wheels of the vehicle.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

The present disclosure is directed to operating a vehicle in a vehicle yaw mode. In some embodiments, each wheel of the vehicle may be independently controlled. In some embodiments, the vehicle may be configured, when certain conditions are met (e.g., when the speed of the vehicle is low enough and/or when the front wheels are aligned parallel to the direction of the vehicle), to operate in the vehicle yaw mode. In some embodiments, while operating in the vehicle yaw mode, the vehicle is configured such that forward torque is provided to the outer wheels of the vehicle and backward torque is provided to the inner wheels of the vehicle. The vehicle yaw mode allows a vehicle to pivot around a point under the chassis of the vehicle.

As referred to herein, the term "vehicle yaw mode" refers to any kind of mode or technique for operating a vehicle such that outer and inner wheels of the vehicle are provided with torques in opposite directions. In some embodiments, the vehicle yaw mode refers to independent control of each wheel. For example, the outer wheels of the vehicle are operated with forward torques and the inner wheels of the vehicle are operated with backward torque. In some embodiments, the vehicle yaw mode refers to independently controlling each wheel to induce a yawing of the vehicle. For example, the outer front wheel of the vehicle is operated with a first forward torque, the outer rear wheel is operated with a second forward torque, the inner front wheel of the vehicle is operated with a first backward torque and the inner rear wheel is operated with a second backward torque.

As referred to herein, the term "inner wheel" refers to a wheel that is closer to the direction of a turn of the vehicle. For example, during a right turn, the right wheels of the vehicle may be considered "inner wheels," while the left wheels of the vehicle may be considered "outer wheels." In another example, during a left turn, the left wheels of the vehicle may be considered "inner wheels," while the right wheels of the vehicle may be considered "outer wheels."

Figure 1:
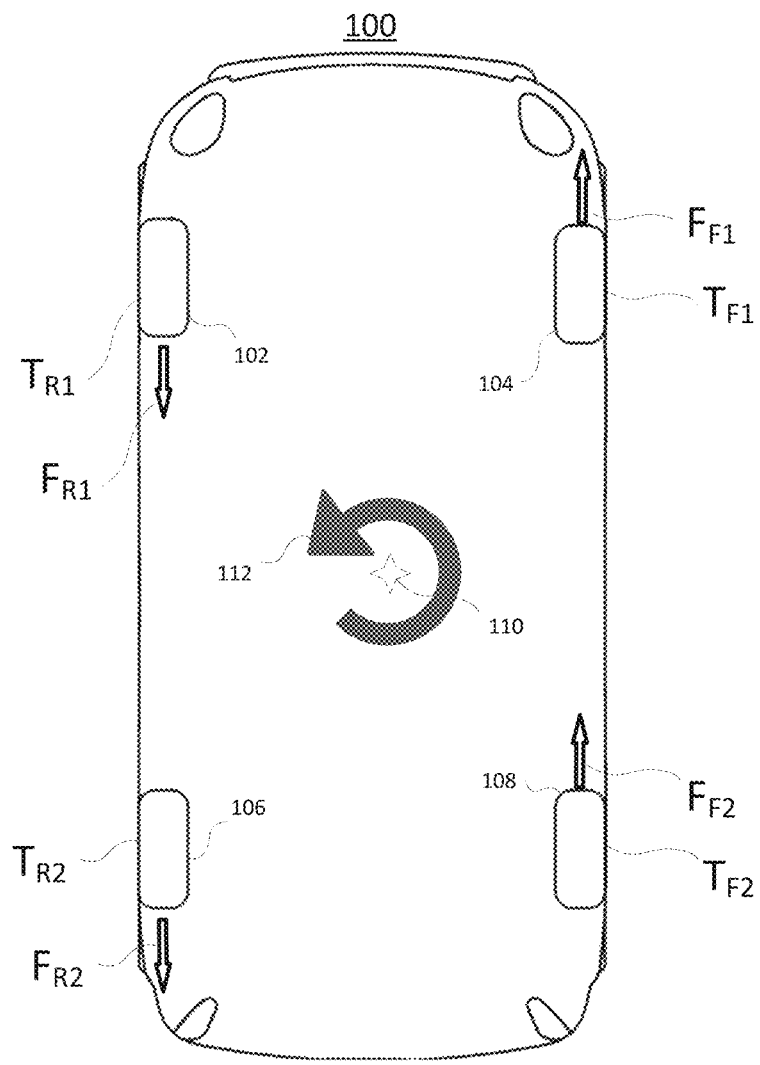
FIG. 1 shows a top view of an illustrative vehicle in accordance with some embodiments of the present disclosure.

FIG. 1 shows a top view of an illustrative vehicle 100 in accordance with some embodiments of the present disclosure. In some embodiments, vehicle 100 may be a coupe, a sedan, a truck, a bus, or any other type of vehicle.

In some embodiments, vehicle 100 may include a front left wheel 102, front right wheel 104, rear left wheel 106, and rear right wheel 108. In some embodiments, front left wheel 102 and front right wheel 104 may be connected via a drive shaft (not shown). In some embodiments, the inner wheels (e.g., front left wheel 102 and rear left wheel 106) may provide backward torques ($T_{R1}$ and $T_{R2}$) to the vehicle. In some embodiments, the outer wheels (e.g., front right wheel 104 and rear right wheel 108) may provide forward torques ($T_{F1}$ and $T_{F2}$) to the vehicle. For example, the front right wheel 104 may provide forward torque $T_{F1}$ to the vehicle and the rear right wheel 108 may provide forward torque $T_{F2}$ to the vehicle. In some embodiments, the inner wheels (e.g., front left wheel 102 and rear left wheel 106) may provide backward torques ($T_{R1}$ and $T_{R2}$) to the vehicle. For example, the front left wheel 102 may provide backward torque $T_{R1}$ to the vehicle and the rear left wheel 106 may provide backward torque $T_{R2}$ to the vehicle.

In some embodiments, the forward torques ($T_{F1}$ and $T_{F2}$) may cause forward forces to be exerted on the outer wheels by the ground. For example, the front forces may provide forward force components ($F_{F1}$ and $F_{F2}$). In some embodiments, the backward torques ($T_{R1}$ and $T_{R2}$) may cause rearward force components ($F_{R1}$ and $F_{R2}$) to be exerted on the inner wheels of the vehicle by the ground. According to some embodiments, when an incline of the vehicle is relatively low (e.g., 1% incline grade or less), a sum of the forward torque ($T_{F1}$ and $T_{F2}$) is substantially equal to a sum of the rearward torque ($T_{R1}$ and $T_{R2}$). On a relatively consistent ground surface, this causes the vehicle to rotate 112 about a point 110 under the chassis of the vehicle. Assuming the forward torque to the outer wheels and the backward torque to the inner wheels are maintained, an exemplary equation illustrating that the sum of these forces is satisfied as follows:

$$T_{F1}+T_{F2} \approx T_{R1}+T_{R2} \tag{Eq. 1}$$

In some embodiments, assuming the forward torque to the outer wheels and the backward torque to the inner wheels are maintained, the vehicle yaw rate is expected to be proportional to a sum of the forward torques ($T_{F1}$ and $T_{F2}$) and the rearward torques ($T_{R1}$ and $T_{R2}$), as illustrated by an exemplary equation as follows:

$$\Sigma \vec{\tau} \alpha \text{ Yaw Rate(Proportional)} \tag{Eq. 2}$$

In some embodiments, the sum of the backward torques ($T_{R1}$ and $T_{R2}$) exerted on the inner wheels (102 and 106) and the sum of the forward torques ($T_{F1}$ and $T_{F2}$) exerted on the outer wheels (104 and 108) causes the vehicle to rotate 112 about point 110 under the chassis of the vehicle while the vehicle remains in a substantially static location. For example, as the backward torque is applied to the inner wheels and the forward torque is applied to the outer wheels, the forces cause the vehicle to rotate about a central point while the vehicle remains in the same location. In some embodiments, the forward torques ($T_{F1}$ and $T_{F2}$) may cause the outer wheels (104 and 108) to slip relative to the ground and backward torques ($T_{R1}$ and $T_{R2}$) may cause the inner wheels (102 and 106) to slip relative to the ground. As the outer wheels (104 and 108) slip forward and the inner wheels (102 and 106) slip backward, the combination of the resulting forward force components ($F_{F1}$ and $F_{F2}$) and the rearward force components ($F_{R1}$ and $F_{R2}$) act on the vehicle and rotate 112 the vehicle about point 110. For example, the force components may cause the vehicle to pivot around a point under the chassis of the vehicle.

In some embodiments, vehicle 100 may operate in vehicle yaw mode in both directions. FIG. 1 depicts a left yaw; however, those skilled in the art will recognize that similar techniques can be used to perform a right yaw.

Figure 2:
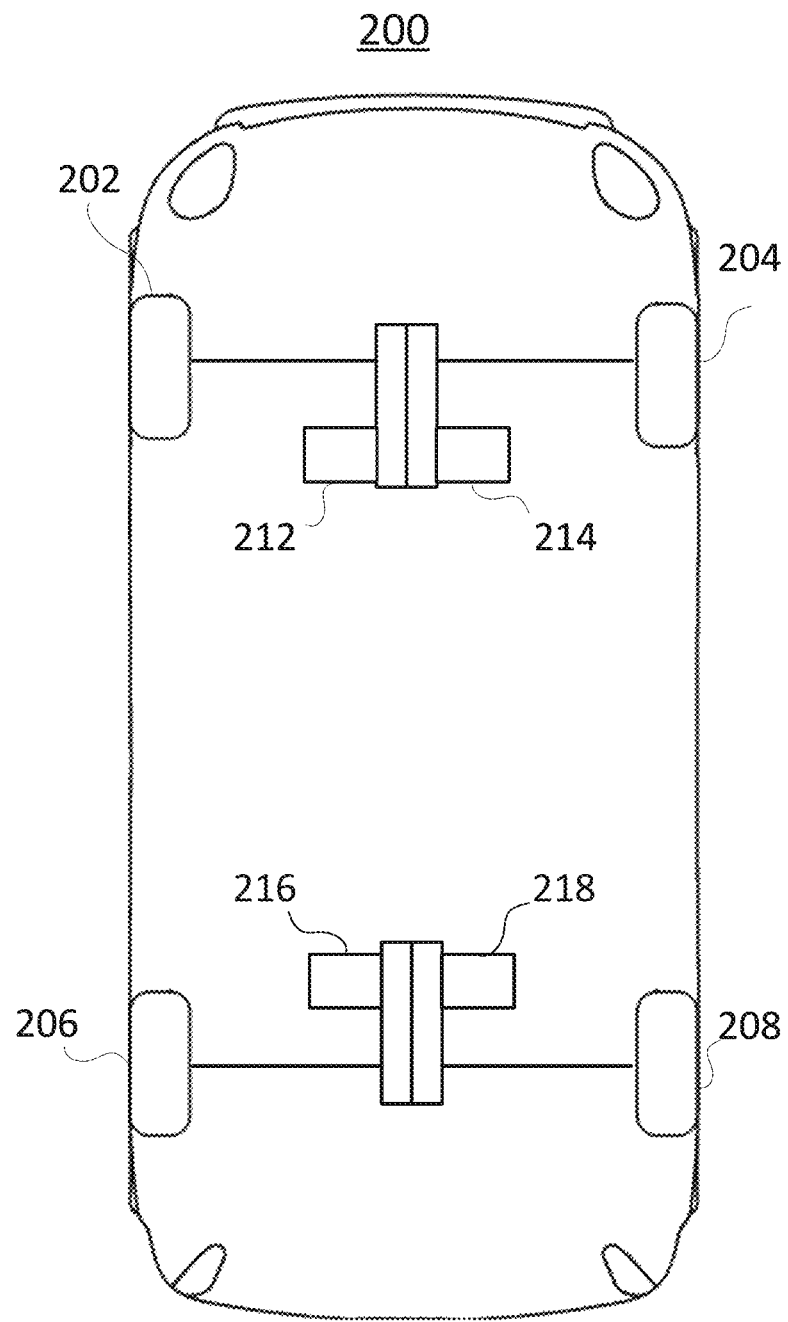
FIG. 2 shows another top view of an illustrative vehicle in accordance with some embodiments of the present disclosure.

FIG. 2 shows a top view of an illustrative vehicle 200 in accordance with some embodiments of the present disclosure. In some embodiments, vehicle 200 may be a coupe, a sedan, a truck, a bus, or any other type of vehicle.

In some embodiments, vehicle 200 may include a front left wheel 202, front right wheel 204, rear left wheel 206, and rear right wheel 208. In some embodiments, vehicle 200 may include a motor 212. Motor 212 may be connected to wheel 202 (e.g., via a belt, chains, gears, or any other connection device). Vehicle 200 may also include motors 214, 216, 218, which are similarly connected to wheels 204, 206, 208, respectively. In some embodiments, motors 212, 214, 216, and 218 may be configured to provide forward torque or backward torque to their respective wheels 202, 204, 206, and 208.

In some embodiments, motors 212, 214, 216, and 218 may be any kind of motors capable of generating power (e.g., gas motors, electric motors). In some embodiments, motors 212, 214, 216, and 218 may be devices connected to a primary single motor (not shown) and configured to independently transfer power from a single motor to wheels 202, 204, 206, and 208, respectively.

In some embodiments, vehicle 200 may include processing circuitry. In some embodiments, the processing circuitry may include an on-board vehicle computer that is capable of controlling multiple features or capabilities of the vehicles.

In some embodiments, processing circuitry may be communicatively connected with user inputs of the vehicle, sensors of the vehicle, and transitory or non-transitory memory (e.g., memory that stores institutions for operating the vehicle).

In some embodiments, vehicle 200 may include a plurality of sensors. For example, some of the plurality of sensors may include sensors for determining speed of vehicle 200, the degree to which the front wheels 202, 204 of vehicle 200 are turned, vehicle rotation sensor to determine the rotation of the vehicle in the vehicle yaw mode, wheel rotation sensors to determine the slipping of each of the wheels 202, 204, 206, and 208 of vehicle 200, and accelerometer sensor.

In some embodiments, the processing circuitry of vehicle 200 may be capable of directly controlling features of vehicle 200 with or without user input. In another example, processing circuitry may be able to actuate motor 212 to provide a specified amount of backward or forward torque to wheel 202. Similar, processing circuitry may be able to actuate any of motors 214, 216, 218 to provide a specified amount of backward or forward torque to wheels 204, 206, 208, respectively.

In some embodiments, the processing circuitry of vehicle 200 may engage the vehicle yaw mode when one or more conditions are met. For example, a user may press a button or turn a lever to request the vehicle yaw mode. In some embodiments, instead, or in addition to the user request, the processing circuitry may determine whether front wheels 202 and 204 are aligned to be parallel to the vehicle. In some embodiments, for the vehicle yaw mode to activate, wheels 202 and 204 are aligned to be parallel to the vehicle. For the yaw mode to reduce turn radius and increase efficiency in turning the vehicle, the wheels may be within 10% turn of the center. For example, the steering wheel can be positioned within 10% of the center. In some embodiments, when the front wheels are not aligned to be parallel to the vehicle, the processing circuitry may automatically rotate the steering wheel to align the front wheels 202 and 204 to be parallel to the vehicle.

In some embodiments, while operating in vehicle yaw mode, the processing circuitry of vehicle 200 may engage an open-loop mode. In the open-loop mode, the processing circuitry may provide forward torque to outer wheels 204, 208 (e.g., by using motors 214 and 218). In some embodiments, the processing circuitry may apply backward torque to the inner wheels 202 and 206 of vehicle 200, for example, by using motors 212 and 216. The open-loop mode performs the vehicle yaw mode without adjusting the output variables (e.g., output of torque is not adjusted based on a sensor, rather torque is ramped up to or set to a specific amount based on user input). For example, the torque applied to the inner wheels and outer wheels is ramped up to 4000 Newton-meters (Nm). In some embodiments, ramping the open-loop forward torque and open-loop backward torque includes gradually increasing the torque. For example, the torque is continuously increased from zero to 4000 Nm. In some embodiments, the torque is increased incrementally in a stepwise pattern up to 4000 Nm. For example, the torque is increased in 200 Nm increments (e.g., 200, 400, 600, 800, etc.) up to 4000 Nm. In another example, the torque is increased in varying increments (e.g., 200, 500, 1000) (e.g., 200, 400, 600, 800, etc.).

In some embodiments, vehicle 200 may operate in a vehicle yaw mode. A left yaw is described herein, however those skilled in the art will recognize that a similar technique may be used to perform a right yaw.

The foregoing FIG. 2 is merely illustrative of the principles of this disclosure, and various modifications may be made by those skilled in the art without departing from the scope of this disclosure. The above-described embodiments are presented for purposes of illustration and not of limitation. For example, any combination of motors and drivetrains may be used in a vehicle in accordance with the present disclosure. In some examples, the rear motors of FIG. 2 may be used in combination with a single front motor. According to such a configuration, the vehicle includes three motors (one front motor and two rear motors). In another example, a single rear motor may be used in combination with the two front motors of FIG. 2. According to such a configuration, the vehicle includes three motors (two front motors and one rear motor).

In some embodiments, the vehicle yaw mode may be used on a vehicle with any combination of axles in accordance with the present disclosure. For example, the vehicle may have a steered axle and a non-steered axle. The steered axle may provide one wheel or a plurality of wheels that will steer the vehicle in a direction. In some embodiments, the steered axle may be provided at the rear of the vehicle. For example, as the user provides an input to steer the vehicle, the rear wheels will turn. In some embodiments, the non-steered axle may provide one wheel or a plurality of wheels that will provide torque to the vehicle. In some embodiments, the vehicle may provide two axles (e.g., steered and non-steered axles). For example, the configuration displayed in vehicle 200 (FIG. 2). In some embodiments, the vehicle may provide three or more axles. For example, the three or more axles may provide at least one steered axle and two or more non-steered axles. According to such a configuration, when the at least one steered axle is turned such that the steered axle is aligned to be parallel to the vehicle, the vehicle yaw mode may be engaged. As the vehicle yaw mode is engaged, the at least one steered axle may include a motor at each wheel. In some embodiments, each motor of the at least one steered axle may provide forward torque to the vehicle on one wheel and backward torque to the vehicle at the other wheel attached to the steering axle. In some embodiments, the two or more non-steered axles may provide backward torque on the same side of the vehicle corresponding to steering axle, and provide forward torque on the same side of the vehicle corresponding to the steering axle, in accordance with the present disclosure.

In some embodiments, the vehicle yaw mode can be used in any vehicle capable of distributing torque and/or braking to the wheels of the vehicle. For example, the vehicle may provide for independent distributing of torque to the outer wheels and the inner wheels. According to another example, the vehicle may provide for independent distribution of torque and braking to the inner wheels and the outer wheels. The foregoing enables a driver to have accurate control of the center of rotation, and thus turn radius, in the vehicle yaw mode.

Figure 3:
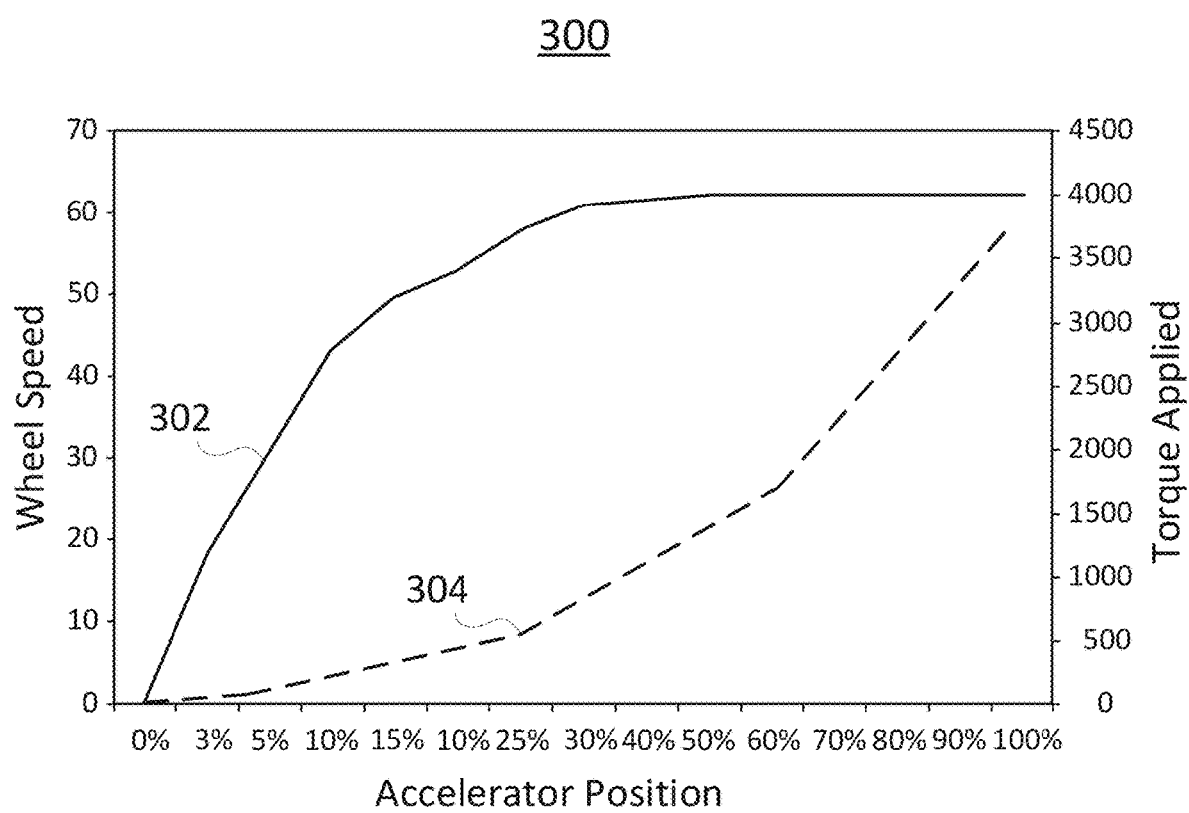
FIG. 3 shows a graph of torque and wheel speed for a vehicle yaw control strategy in accordance with some embodiments of the present disclosure.

FIG. 3 shows a graph 300 of torque and wheel speed for a vehicle yaw control strategy in accordance with some embodiments of the present disclosure. While operating in open-loop mode, torque curve 302 shows the open-loop torque (e.g., in Nm) that is applied to each of the wheels. More specifically, torque curve 302 shows how torque is increased over time. The torque is initially increased rapidly and then the rate of increase decreases over time. As shown, the torque increases from 0 to a maximum torque permitted by each wheel. When each wheel begins to slip, the rotational speed of the wheel increases. Upon the wheels braking grip with the ground and slipping, processing circuitry engages the closed-loop mode. In some embodiments, the processing circuitry controls wheel speed based on wheel speed curve 302. Wheel speed curve 302 shows the maximum wheel speed (e.g., in MPH) allowed based on accelerator position, which is represented as a percentage along the x-axis of graph 300. For example, when a wheel speed increases and approaches wheel speed curve 304, the processing circuitry can adjust the torque to the wheel and/or apply braking to prevent the wheel speed from exceeding wheel speed curve 304.

In some embodiments, graph 300 shows a vehicle that operates in open-loop mode with torque curve 302 and switches upon the wheels slipping to the closed-loop mode with the wheel speed based on wheel speed curve 304. To make the process efficient, the processing circuitry reduces time between switching from the torque curve 302 to the wheel speed curve 304. For example, as the torque ramps up, the higher initial torque on the torque curve 302 can aide in braking the grip on the wheels, which results in switching to the wheel speed curve 304 in the closed-loop mode. Table 1 reproduced below, shows data represented on the graph.

TABLE 1

| Actuator Position (%) | Percentage of Max Slip Speed (%) | Percent of Peak Torque (%) |
| --- | --- | --- |
| 0 | 0 | 0 |
| 3 | 1 | 30 |
| 5 | 3 | 50 |
| 10 | 6 | 70 |
| 15 | 9 | 80 |
| 20 | 11 | 85 |
| 25 | 14 | 93 |
| 30 | 21 | 98 |
| 40 | 29 | 99 |
| 50 | 36 | 100 |
| 60 | 43 | 100 |
| 70 | 57 | 100 |
| 80 | 71 | 100 |
| 90 | 86 | 100 |
| 100 | 100 | 100 |

In some embodiments, the actuator input corresponds to the accelerator pedal.

Figure 4:
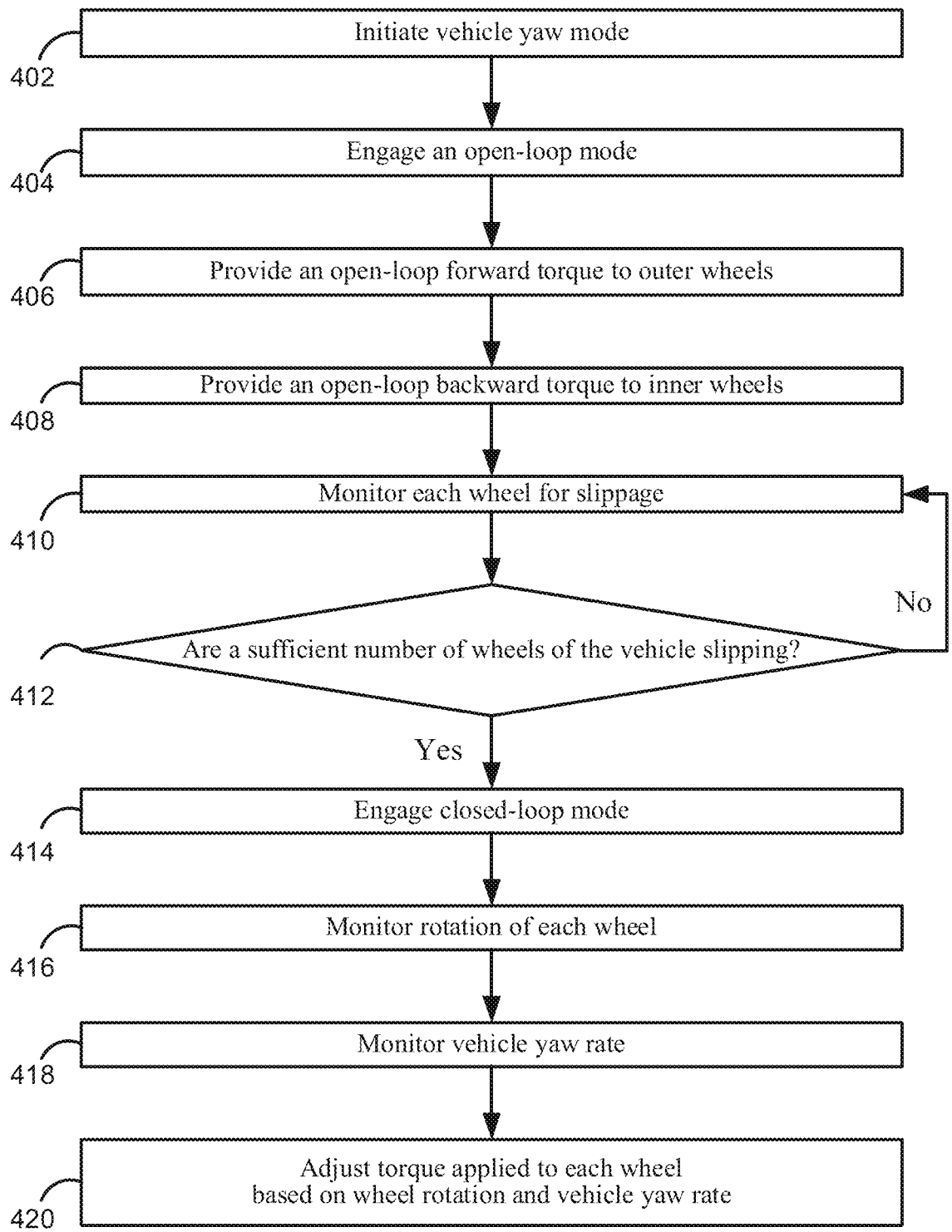
FIG. 4 depicts an illustrative flow diagram of a process for operating a vehicle, in accordance with some embodiments of the present disclosure.

FIG. 4 depicts an illustrative flow diagram of a process 400 for operating a vehicle in several modes in accordance with several embodiments of the disclosure. In some embodiments, process 400 may be executed by processing circuitry of vehicle 200 (FIG. 2). It should be noted that process 400 or any step thereof could be performed on, or provided by, the system of FIG. 9. In addition, one or more steps of process 400 may be incorporated into or combined with one or more other steps described herein.

Process 400 begins at 402, where the processing circuitry may initiate a vehicle yaw mode. For example, the processing circuitry may initiate the vehicle yaw mode after the user issues a command requesting such mode (e.g., by pressing an approximate button, or via any other input). The processes circuitry may determine whether one or more yaw mode initialization criteria are met. For example, whether a turn amount of the front wheels of the vehicle is satisfied (e.g., the turn angle of wheels 202 and 204)). In some embodiments, the processing circuitry may use a gauge connected to a steering column to determine the turn angle of the wheels.

Process 400 continues at 404, where the processing circuitry may proceed depending on the outcome of step 402. For example, if the number of initialization criteria is satisfied, the processing circuitry may proceed to step 404. At 404, the processing circuitry may engage the open-loop mode. As part of the open-loop mode of the vehicle yaw mode, the processing circuitry may perform steps 406-410. Steps 406-408 may be performed in any order, or simultaneously.

At 406, the processing circuitry may provide an open-loop forward torque to the outer wheels of the vehicle. For example, the processing circuitry may actuate motors 214 and 218 to provide forward torque to wheels 204 and 208. The open-loop torque is a ramp-up of torque to the wheel without adjusting the torque based on monitoring of any sensor data. For example, in the open-loop mode, torque ramps up regardless of the accelerator pedal input. Generally, the torque is increased until the vehicle engages closed-loop mode.

At 408, the processing circuitry may provide an open-loop backward torque to inner wheels of the vehicle. For example, the processing circuitry may actuate motors 212 and 216 to provide backward torque to wheels 202 and 206. The open-loop torque is a ramp-up of torque to the wheel without adjusting the torque based on monitoring of any sensor data. For example, in the open-loop mode, torque ramps up regardless of the accelerator pedal input. Generally, the torque is increased until the vehicle engages closed-loop mode.

In some embodiments, for each of steps 406 and 408, the processing circuitry may actuate motors 214 and 218 to provide open-loop forward torque to wheels 204 and 208 and actuate motors 212 and 216 to provide open-loop backward torque to wheels 202 and 206.

At 410, the processing circuitry may monitor each wheel's rotation for slippage. For example, the processing circuitry may monitor the rotation of each wheel 202, 204, 206, and 208 based on the sensors at each motor 212, 214, 216, and 218. In some embodiments, the processing circuitry may monitor the rotation of each wheel based on a sensor at each wheel. Based on rotational speed (e.g., 0.5 revolutions per second) the processing circuitry may determine that a wheel is slipping.

Process 400 continues at 414, where the processing circuitry may proceed depending on the outcome of step 412. In some embodiments, at step 412 the processing circuitry may determine if a sufficient number of wheels of the vehicle are slipping. A sufficient number of wheels slipping varies based on the circumstances. In some embodiments, the sufficient number of wheels slipping may be 2 wheels. In another embodiment, the sufficient number of wheels slipping may be 3 wheels. In another embodiment, the sufficient number of wheels slipping may be 4 wheels. In some embodiments, in response to determining that a sufficient number of wheels are slipping, at 414, the processing circuitry may engage a closed-loop mode. For example, as two diagonal wheels are slipping, the processes circuitry may engage the closed-loop mode. In another example, the circuitry may determine that 3 wheels are slipping and determine that is a sufficient number of wheels slipping and engage the closed-loop mode. On the other hand, if there is no sufficient amount of wheels slipping, the processing circuitry may continue to monitor each wheel for slippage at 410.

As part of the closed-loop mode of the vehicle yaw mode, the processing circuitry may perform steps 416-420. Steps 416-420 may be performed in any order, or simultaneously. In some embodiments, steps 416-420 may be adjusted based on user input. For example, the amount of torque provided to the inner wheels of the vehicle and to the outer wheels of the vehicle may be proportional to how far the user presses the accelerator pedal or may be determined based on a look-up table. In some embodiments, the amount of forward torque provided to the outer wheels is greater than the amount of backward torque provided to the inner wheels. In some embodiments, if the user stops pressing the accelerator pedal, the processing circuitry may stop providing torque to any of the wheels of the vehicle. In some embodiments, as the accelerator pedal is pressed, the rotation of the vehicle (i.e., yaw rate) about a pivot point is performed. For example, as the user presses the accelerator pedal, the vehicle will begin to rotate about the pivot point, and as the user increases the throttle by pressing the accelerator pedal further, the rotation of the vehicle increases. According to another example, as the user releases the accelerator pedal, the amount of forward torque provided to the outer wheels and backward torque provided to the inner wheels is reduced and the vehicle stops rotating.

In some embodiments, at 416, the processing circuitry may monitor the rotation of each wheel. As discussed with open-loop mode, sensors in the vehicle monitor each wheel's rotational speed.

In some embodiments, at 418, the processing circuitry may monitor the vehicle yaw rate. In some embodiments, the vehicle yaw rate is determined by one or more vehicle rotation sensors. The vehicle's rotation sensors provide data indicative of the rotation of the vehicle. In some embodiments, the control circuitry may be communicatively connected to one or more orientation sensors that provide data indicative of the orientation of vehicle 100 in 3D space. For example, orientation sensors 916 of FIG. 9 may provide data indicative of a pitch angle of vehicle 100, yaw angle of vehicle 100, and roll angle of vehicle 100.

In some embodiments, the process 400 continues at 420, where the processing circuitry may adjust torque applied to each wheel based on the vehicle rotation and vehicle yaw rate. In some embodiments, the processing circuitry may adjust forward torque to each wheel of the outer wheels and backward torque to each wheel of the inner wheels, based on each wheel's respective rotation and the vehicle yaw rate. In some embodiments, the amount of forward torque provided to the outer wheels and backward torque provided to the inner wheels is based on the amount the accelerator pedal is pressed. For example, the amount of torque may be proportional to the amount the accelerator pedal is pressed or may be determined using a look-up table. In some embodiments, the forward torque to wheels 204 and 208 is higher than the backward torque to wheels 202 and 206. In some embodiments, the forward torque to wheels 204 and 208 is lower than the backward torque to wheels 202 and 206. In some embodiments, the forward torque at each wheel 204 and 208 and the backward torque at each wheel 202 and 206 varies. For example, the value of the backward torque at wheel 202 may be approximately similar to the forward torque at wheel 208, a wheel that is diagonal from wheel 202. In another example, the value of the torque at each wheel 202, 204, 206 and 208 can be different. The torque can be adjusted based on the rotational speed of each wheel, so that when the wheel is on low friction surface, a rotational speed does not exceed a rotation threshold to prevent wheel and drivetrain wear. In another example, a first forward torque at the outer front wheel with a low friction surface (e.g., sandy terrain, icy terrain) can cause the wheel to have a high rotational speed (e.g., 10 revolutions per second), while a similar forward torque at the outer rear wheel with high friction surface (e.g., gravel terrain) can cause the wheel to have moderate rotational speed (e.g., 4 revolutions per second). Accordingly, the forward torque applied to the outer front wheel and backward torque applied to the inner front wheel may be adjusted to reduce the rotation speed.

Figure 5A:
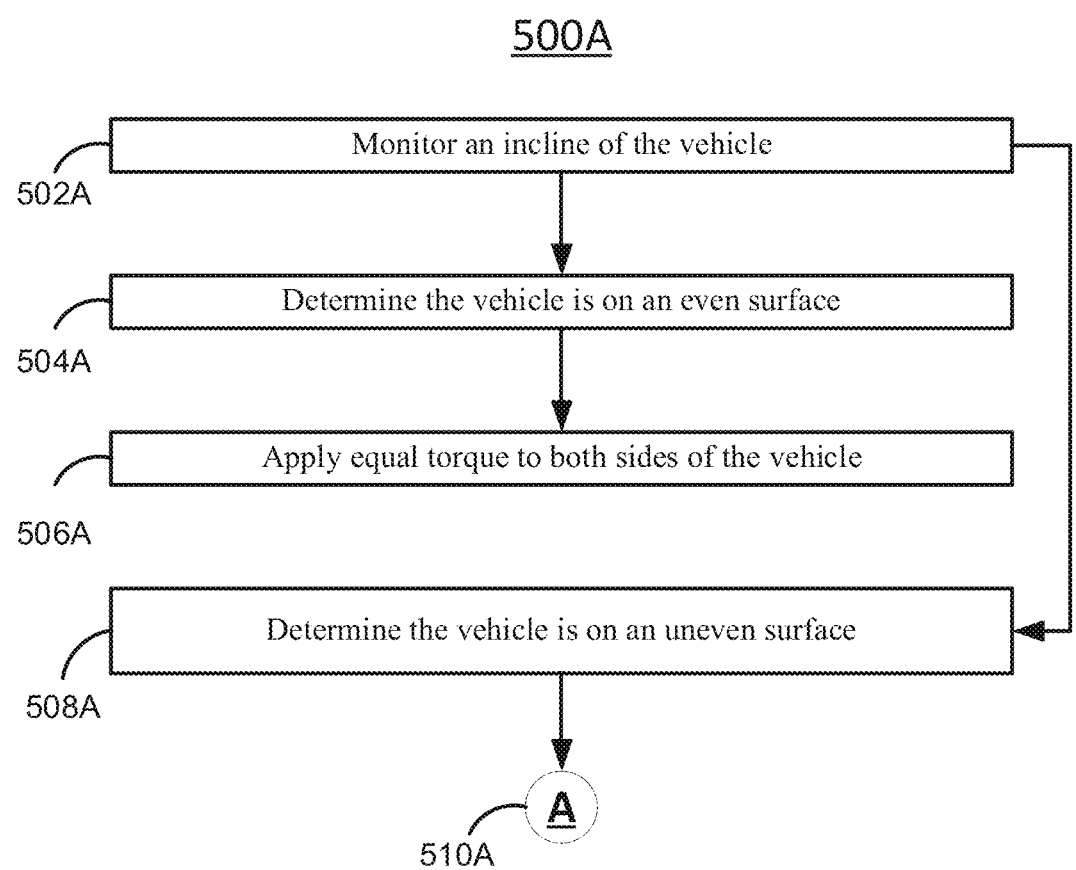
FIGS. 5A and 5B depict various examples of illustrative flow diagrams of processes for controlling a torque induced vehicle yaw based on incline of the surface, in accordance with some embodiments of the disclosure.

FIG. 5A depicts an illustrative flow diagram of a process 500A for operating a vehicle on an even surface in accordance with several embodiments of the disclosure. In some embodiments, process 500A may be executed by processing circuitry of vehicle 200 (FIG. 2). It should be noted that process 500A or any step thereof could be performed on, or provided by, the system of FIG. 9. In addition, one or more steps of process 500A may be incorporated into or combined with one or more other steps described herein.

Process 500A begins at 502A, where the processing circuitry may monitor an incline of the vehicle. An incline surface can be identified by sensors monitoring the orientation of the vehicle. At 504A, the processing circuitry determines that the vehicle is on an even surface (e.g., less than 1% incline grade). At 506A, the processing circuitry may provide forward torque to the outer wheels that is equal to the backward torque to the inner wheels. In some embodiments, the processing circuitry at 508A may determine that the vehicle is on an uneven surface (e.g., greater than 1% incline grade). The vehicle may be on an incline surface, a banked surface or a combination thereof. In response to determining that the vehicle is on the uneven surface, process 500A proceeds to 510A, which starts process 500B (FIG. 5B).

Figure 5B:
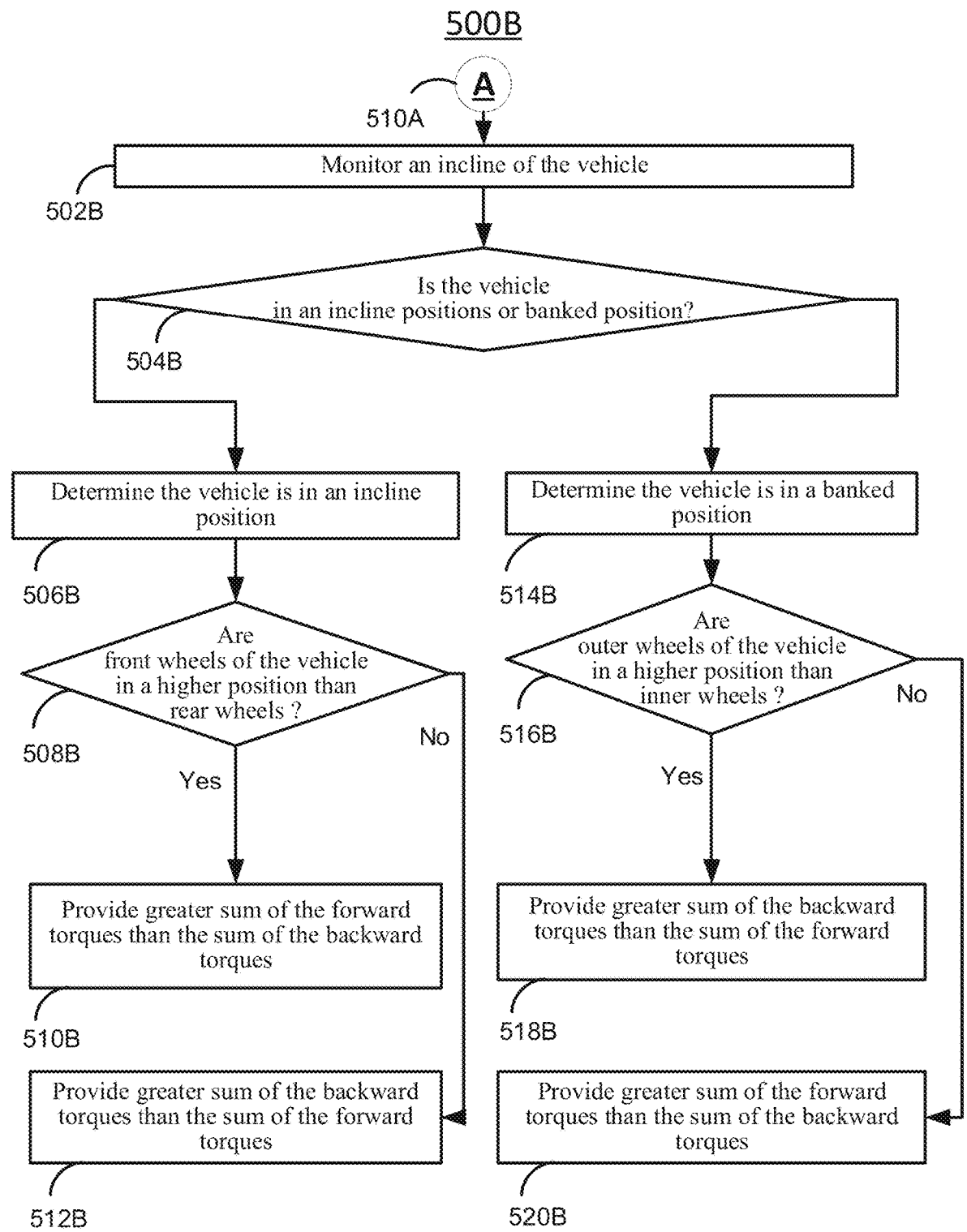

FIG. 5B depicts an illustrative flow diagram of a process 500B for operating a vehicle on an uneven surface in accordance with several embodiments of the disclosure. In some embodiments, process 500B may be executed by processing circuitry of vehicle 200 (FIG. 2). It should be noted that process 500B or any step thereof could be performed on, or provided by, the system of FIG. 9. In addition, one or more steps of process 500B may be incorporated into or combined with one or more other steps described herein.

Process 500B begins at 510A, where the processing circuitry continues from process 500A, where the vehicle is determined to be on an uneven surface. At 502B, the processing circuitry may monitor the incline of the vehicle. For example, to determine whether the vehicle is in incline position or in a banked position.

Process 500B continues at 504B, where the processing circuitry may determine that the vehicle is in an incline position or in a banked position. An incline position/banked position can be identified by sensors monitoring the orientation of the vehicle. For example, the processing circuitry may determine that the vehicle is in the incline position with the front wheels being disposed higher than the rear wheels. In another example, the processing circuitry may determine that the vehicle is in the banked position with the outer wheels (i.e., front outer wheel and rear outer wheel) being disposed higher than the inner wheels (i.e., front inner wheel and rear inner wheel).

Process 500B continues at 506B, where the processing circuitry may proceed depending on the outcome of decision 504B. For example, the processing circuitry may determine that the vehicle is in the incline position with the front wheels higher than the rear wheels. In another example, the processing circuitry may determine that the vehicle is on the incline position with the rear wheels higher than the front wheels. Process 500B continues to 508B, to determine if the front wheels of the vehicle are higher position than rear wheels. If the front wheels are higher (i.e., vehicle is facing up the incline), at 510B, the processing circuitry applies forward torque to the outer wheels, such that a sum of the forward torque to the outer wheels is greater than the sum of the backward torque to the inner wheels. On the other hand, if the rear of the vehicle is higher (i.e., vehicle is facing down the incline), at 512B, the processing circuitry applies backward torques to the inner wheels, such that a sum of the backward torque to the inner wheels is greater than the sum of the forward torque to the outer wheels. For example, the processing circuitry may provide reduced backward torque to the inner wheels as compared to the forward torque to the outer wheels (or additional forward torque to the outer wheels as compared to the backward torque to the inner wheels) because gravity is providing a backward force on the vehicle.

If on the other hand, as process 500B continues at 504B, the processing circuitry determines that the vehicle is in the banked position. Process 500B continues at 514B, the processing circuitry may proceed depending on the outcome of step 504B. For example, the processing circuitry may determine that the vehicle is in a banked position with the outer wheels (i.e., front outer wheel and rear outer wheel) being disposed higher than the inner wheels (i.e., front inner wheel and rear inner wheel). Based on the determination of the surface being banked towards one direction, the processing circuitry may adjust the torques applied to each of the wheels to achieve a vehicle rotation rate in accordance with the present disclosure. For example, the processing circuitry may provide increased torque to the wheels on the higher side of the vehicle as compared to the wheels on the lower side of the vehicle because the bank causes the higher wheels to carry less of the vehicle weight than the lower wheels.

In some embodiments, as process 500B continues at 504B, the processing circuitry determines that the vehicle is in a combination of an inclined position and a banked position. In such a position, one of the wheels of the vehicle is higher than the other three wheels. For example, the front outer wheel is higher than the front inner wheel, rear outer wheel, and rear inner wheel. The processing circuitry, in response to determining the vehicle is in the combination of inclined and banked positions, may adjust the torques applied to each of the wheels independently to achieve a vehicle yaw rate in accordance with the present disclosure. For example, the processing circuitry may provide increased torque to the wheels on the higher side of the vehicle as compared to the wheels on the lower side of the vehicle because the bank and incline cause the higher wheels to carry less of the vehicle weight than the lower wheels. In some embodiments, the vehicle may apply torque to each wheel to maintain slippage of each of the wheel as the vehicle rotates (yaws) about a substantially static location on the inclined and banked surface.

Process 500B continues to 516B, to determine if the outer wheels of the vehicle are higher position than inner wheels or if it's the other way around. If the outer wheels are higher (i.e., vehicle is facing the incline sideways with side with forward torque being higher), at 518B, the processing circuitry applies backward torque to the inner wheels, such that a sum of the backward torque to the inner wheels is greater than the sum of the forward torque to the outer wheels. On the other hand, if the inner side of the vehicle is higher (i.e., vehicle is facing the incline sideways with the side with backward torque higher), at 520B, the processing circuitry may apply forward torque to the outer wheels, such that a sum of forward torque to the outer wheels is greater than the sum of backward torque to the inner wheels.

In some embodiments, the difference in forward torque applied to the outer wheels and the backward torque applied to the inner wheels is a function of an angle of the incline of the vehicle. For example, an angle of the incline of the vehicle on an 8% incline grade, has a proportionately greater difference between the forward torque than the backward torque as compared against an angle of the incline of the vehicle on a 3% incline grade.

Figure 6:
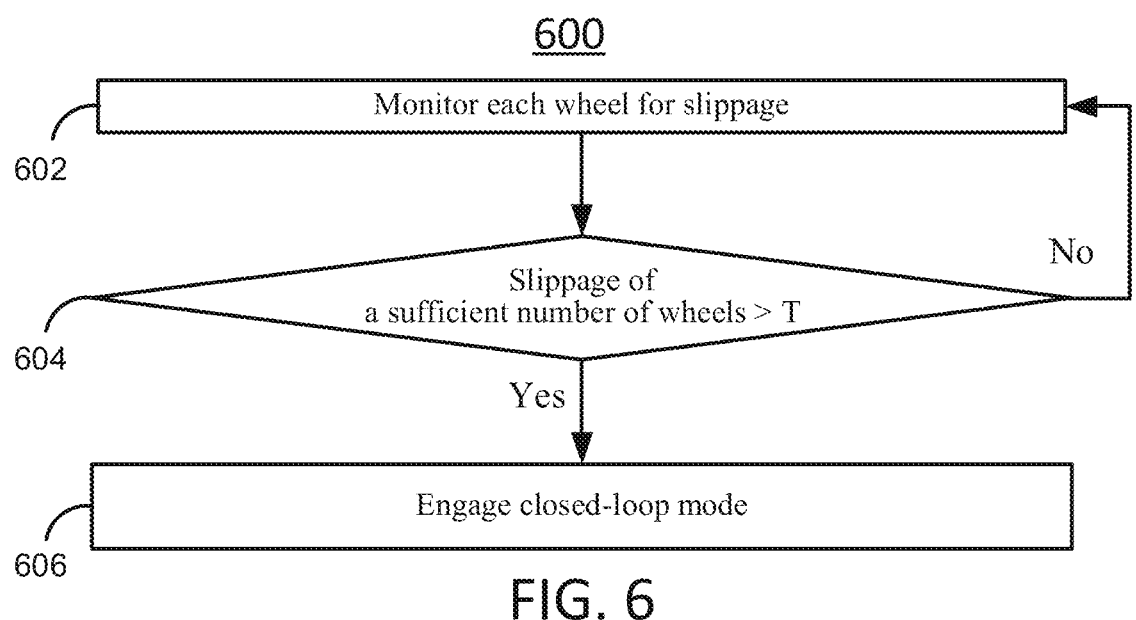
FIG. 6 depicts an illustrative flow diagram of a process for engaging a closed-loop mode of the vehicle, in accordance with some embodiments of the present disclosure.

FIG. 6 depicts an illustrative flow diagram of process for engaging a closed-loop mode of the vehicle, in accordance with some embodiments of the disclosure. As shown in FIG. 6, according to some embodiments, a process 600 may be executed by processing circuitry of vehicle 200 (FIG. 2). It should be noted that process 600 or any step thereof could be performed on, or provided by, the system of FIG. 9. In addition, one or more steps of process 600 may be incorporated into or combined with one or more other steps described herein (e.g., incorporated into steps of processes 400, 500A, 500B, 700A, 700B, 800A, and 800B).

Process 600 begins at 602, where the processing circuitry may monitor each wheel for slippage. For example, the processing circuitry may monitor each wheel 202, 204, 206 and 208 for wheel slippage. Process 600 continues at 604, where the processing circuitry may determine if a sufficient number of wheels are slipping based on a target number of wheels slipping. In some embodiments, the vehicle has sensors at each wheel or at each motor connected to the wheels. Based on information provided from the sensors, the processing circuitry may determine when a wheel is slipping. In some embodiments, the processing circuitry may, in response to determining a sufficient number of wheels of the vehicle are slipping, at 606 engage a closed-loop mode. A sufficient number of wheels slipping may be 2 wheels, 3 wheels or 4 wheels. In some embodiments, two wheels slipping are diagonal to each other (e.g., front outer wheel and rear inner wheel).

Figure 7A:
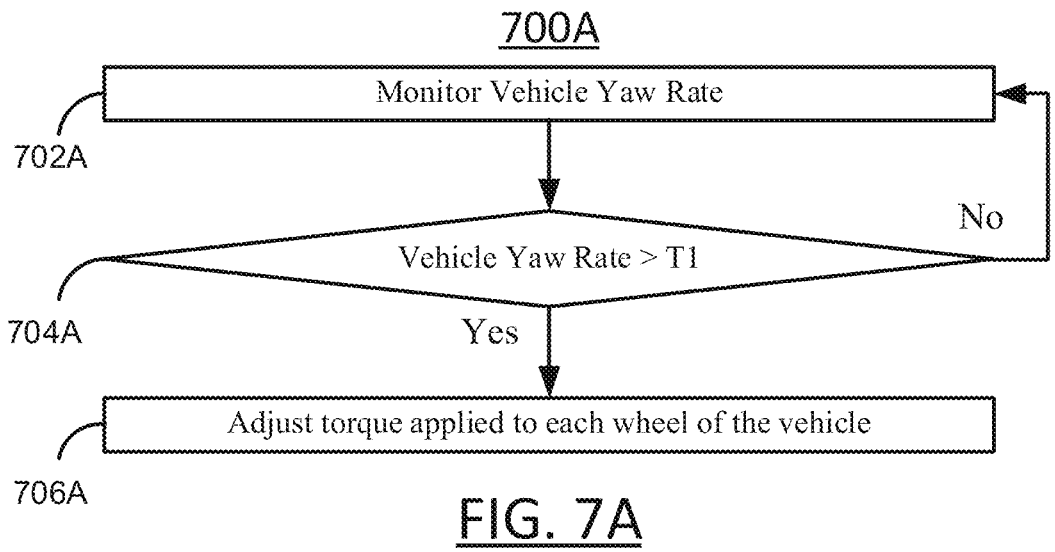
FIGS. 7A and 7B depict various examples of illustrative flow diagrams of processes for controlling a vehicle in a vehicle yaw mode, in accordance with some embodiments of the disclosure.

FIG. 7A depicts an illustrative flow diagram of processes for operating a vehicle in a vehicle yaw mode, in accordance with some embodiments of the disclosure. As shown in FIG. 7A, according to some embodiments, a process 700A may be executed by processing circuitry of vehicle 200 (FIG. 2). It should be noted that process 700A or any step thereof could be performed on, or provided by, the system of FIG. 9. In addition, one or more steps of process 700A may be incorporated into or combined with one or more other steps described herein (e.g., incorporated into steps of processes 400, 500A, 500B, 600, 700B, 800A, and 800B).

Process 700A begins at 702A, where the processing circuitry may monitor vehicle yaw rate. For example, the processing circuitry may monitor positional sensors around the vehicle to monitor the vehicle yaw rate. Process 700A continues at 704A, where the processing circuitry compares the measured vehicle yaw rate against a vehicle yaw target rate Ti. If the processing circuitry determines that the vehicle yaw rate is greater than the vehicle yaw target rate ("Yes" at 704A), then at 706A the processing circuitry adjusts the torque applied to the wheels. In some embodiments, if the vehicle yaw rate is too fast, the processing circuitry adjusts torque applied to the wheels to adjust the yaw rate. In some embodiments, the processing circuitry may reduce torque applied to each wheel, or may apply brakes to each wheel to reduce the yaw rate within the target yaw rate. If on the other hand, processing circuitry determines that the vehicle yaw rate is less than the vehicle yaw target rate ("No" at 704A), then 702A is repeated.

Figure 7B:
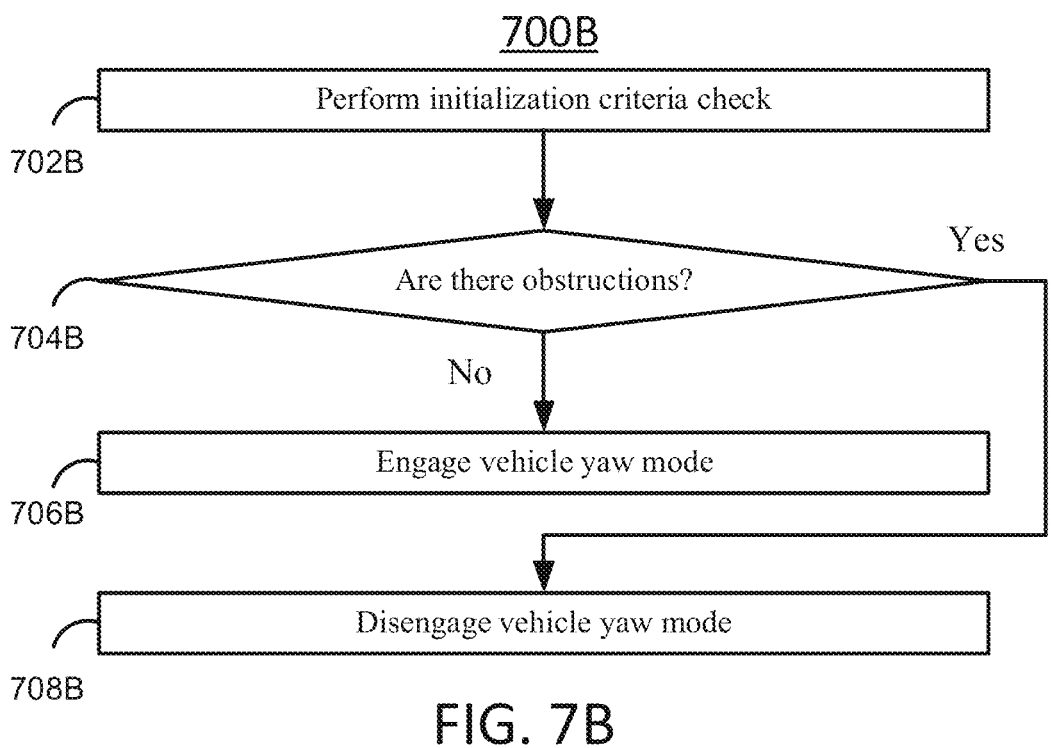

FIG. 7B depicts an illustrative flow diagram of processes for operating a vehicle in a vehicle yaw mode, in accordance with some embodiments of the disclosure. As shown in FIG. 7B, according to some embodiments, process 700B may be executed by processing circuitry of vehicle 200 (FIG. 2). It should be noted that processes 700B or any step thereof could be performed on, or provided by, the system of FIG. 9. In addition, one or more of processes 700B may be incorporated into or combined with one or more other steps described herein (e.g., incorporated into steps of processes 400, 500A, 500B, 600, 700A, 800A, and 800B).

Process 700A begins at 702A, where the processing circuitry may perform one or more initialization checks. The initialization checks can include confirming wheel alignment, drive mode, vehicle speed, periphery checks, geofencing, and vehicle health. In some embodiments, additional or alternative checks can be performed to determine when to disengage vehicle yaw mode. For example, when the vehicle is on a relatively high friction surface, the vehicle yaw mode can be disengaged. A high friction surface can be identifying by monitoring wheel rotation and the amount of torque applied to the wheels. If a relatively high amount of torque is applied to the wheels and the wheels are not rotating after a predetermined period (e.g., 15 seconds, 30 seconds, etc.), this may indicate a relatively high friction surface. In such a situation, the vehicle yaw mode can be disengaged to prevent tire and drivetrain wear. The process 700B at 704B monitors for obstructions (via obstruction detection sensors 911) around the vehicle. The vehicle may have sensors around the vehicle monitoring for obstruction. For example, a sensor can monitor in a blind spot for objects which would interfere with the yaw of the vehicle. If the processing circuitry determines that an obstruction exist ("Yes" at 704B), then at 708B, the processing circuitry disengages the vehicle yaw mode. In some embodiments, if the vehicle yaw rate is engaged and a person walks alongside the vehicle, the processing circuitry identifies the obstruction (e.g., person walking), and stops the vehicle yaw. If on the other hand, processing circuitry determines that no obstructions exist ("No" at 704B), then at 706B, vehicle yaw mode is permitted to proceed.

Figure 8A:
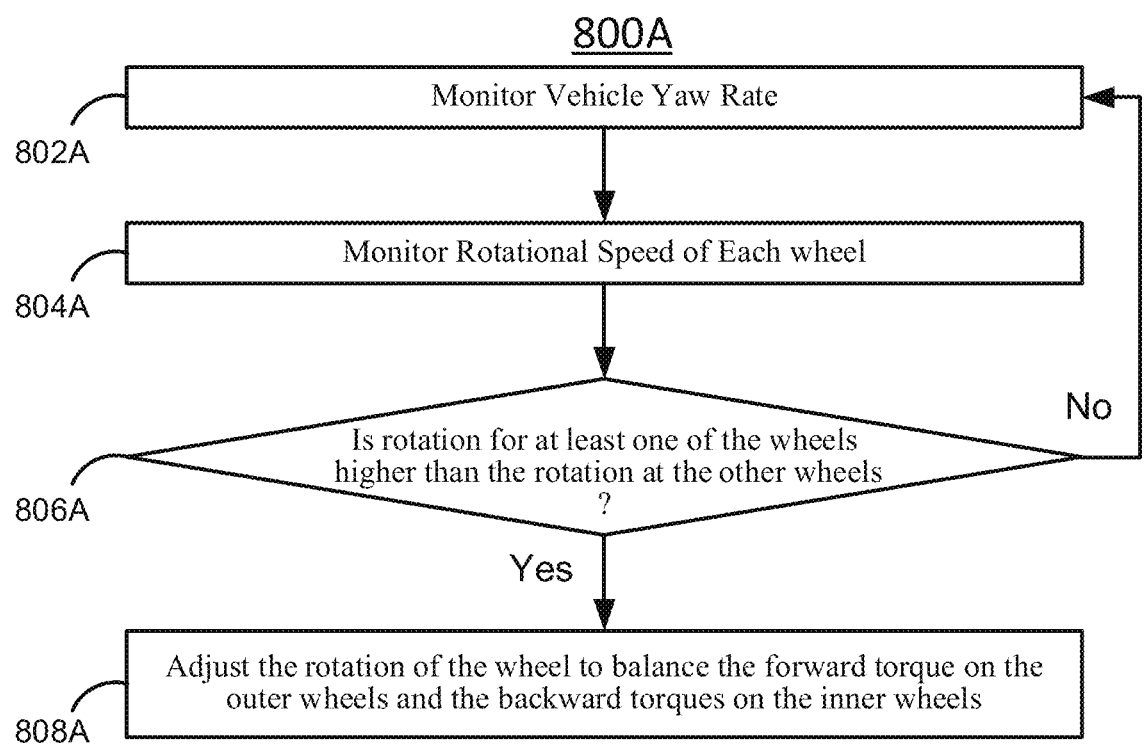
FIGS. 8A and 8B depict various examples of illustrative flow diagrams of processes for controlling a vehicle in a vehicle yaw mode, in accordance with some embodiments of the disclosure.

FIG. 8A depicts an illustrative flow diagram of processes for operating a vehicle in a vehicle yaw mode, in accordance with some embodiments of the disclosure. As shown in FIG. 8A, according to some embodiments, a process 800A may be executed by processing circuitry of vehicle 200 (FIG. 2). It should be noted that process 800A or any step thereof could be performed on, or provided by, the system of FIG. 9. In addition, one or more of the steps of process 800A may be incorporated into or combined with one or more other steps described herein (e.g., incorporated into steps of processes 400, 500A, 500B, 600, 700A, 700B, and 800B).

Process 800A begins at 802A, where the processing circuitry may monitor vehicle yaw rate. For example, the processing circuitry may monitor the rotation of the vehicle based on positioning sensors on the vehicle. Process 800A continues at 804A, where the processing circuitry may monitor rotation of each of the wheels 202, 204, 206 and 208. For example, the processing circuitry may monitor for wheel slippage of each wheel of the vehicle. Process 800A continues at 806A, where the processing circuitry may proceed depending on the outcomes of step 804A. At 806A, the processing circuitry may compare the rotation of each wheel 202, 204, 206, and 208 to a target spin rate. In some embodiments, the processing circuitry determines that at least one of the wheels is higher than the rotation of the other wheels. For example, it is the intent for a sufficient number of wheels to spin, however, the spinning of each of the wheels should be relatively similar as compared to a target spin rate. For example, if the delta between the rotation of the outer wheels (front outer wheel and rear outer wheel) is greater than a wheel spin threshold, the processing circuitry may proceed to step 808A, to adjust torque to a diagonal wheel to balance the torque applied to the other wheels. In some examples, processing circuitry may adjust torque to an adjacent wheel to balance the torque applied to the other wheels. In yet another example, the processing circuitry may adjust torque to a wheel that is spinning higher than the rotation to the other wheels. Otherwise, if no adjustments are necessary process 800A may return to step 802A and continue monitoring the vehicle yaw rate.

Figure 8B:
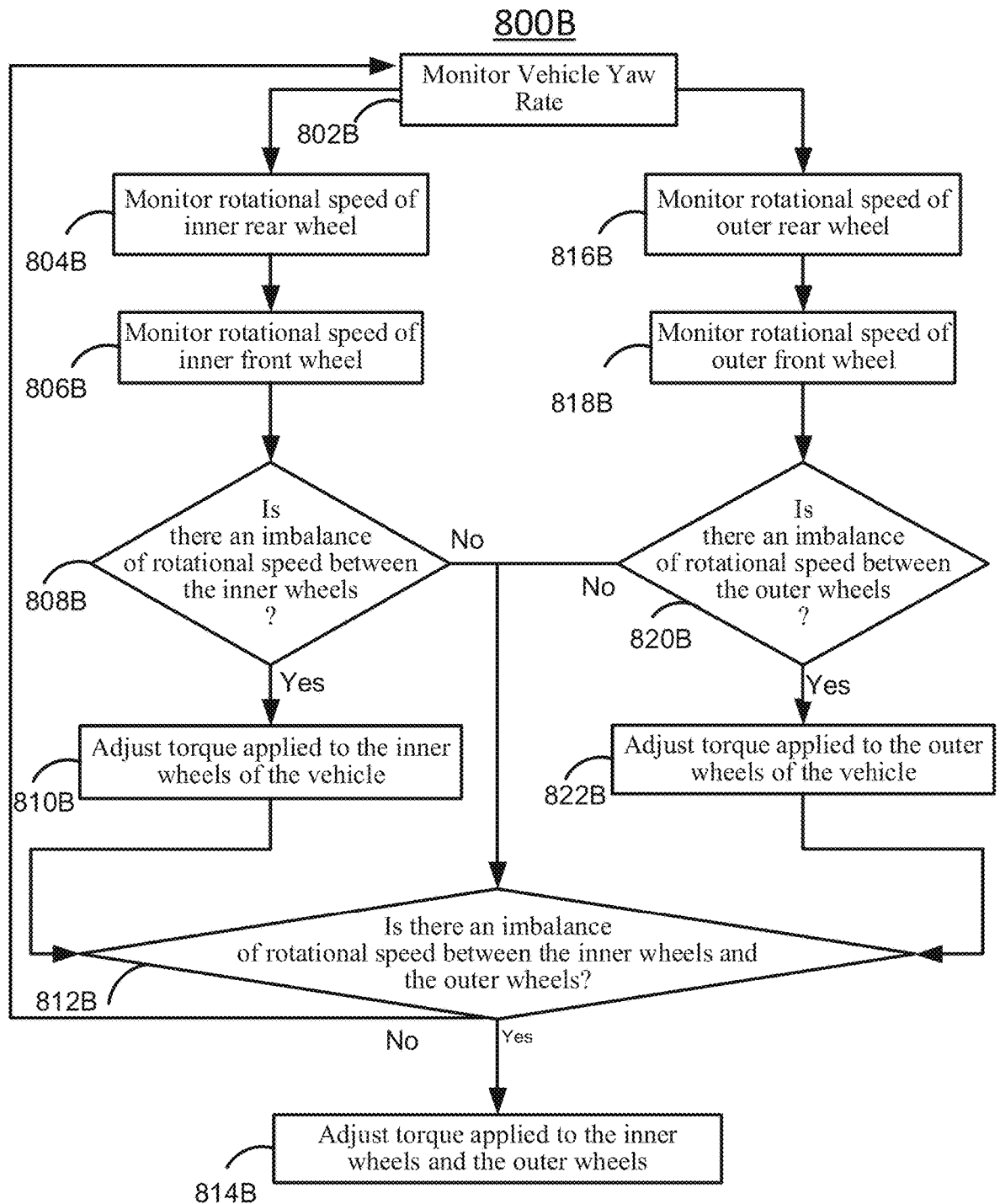

FIG. 8B depicts an illustrative flow diagram of processes for operating a vehicle in a vehicle yaw mode, in accordance with some embodiments of the disclosure. As shown in FIG. 8B, according to some embodiments, process 800B may be executed by processing circuitry of vehicle 200 (FIG. 2). It should be noted that processes 800B or any step thereof could be performed on, or provided by, the system of FIG. 9. In addition, one or more of processes 800B may be incorporated into or combined with one or more other steps described herein (e.g., incorporated into steps of processes 400, 500A, 500B, 600, 700A, 700B, and 800A).

Process 800B begins at 802B, where the processing circuitry may monitor vehicle yaw rate. For example, the processing circuitry may monitor the rotation of the vehicle based on positioning sensors on the vehicle. As part of the closed-loop mode of the vehicle yaw mode, the processing circuitry may perform steps 804B, 806B, 816B and 818B. Steps 804B, 806B, 816B and 818B may be performed in any order, or simultaneously. Process 800B continues at 804B, where the processing circuitry may monitor rotational speed of the inner rear wheel. Process 800B continues at 806B, where the processing circuitry may monitor rotational speed of the inner front wheel. Separately, the process 800B continues at 816B, where the processing circuitry may monitor rotational speed of the outer rear wheel. Process 800B continues at 818B, where the processing circuitry may monitor rotational speed of the outer front wheel.

Process 800B continues at 808B, where the processing circuitry determines that at least one of the inner wheels (inner front wheel and inner rear wheel) is rotating at a higher revolution rate than the other inner wheel. If the processing circuitry determines that there is an imbalance in the rotation of each of the inner wheels ("Yes" at 808B), then at 810B the processing circuitry adjusts (e.g., increasing or decreasing) the torque to each of the inners wheels (e.g., front inner wheel and rear inner wheel) to narrow the imbalance. Process 800B continues at 812B, where processing circuitry determines if there is an imbalance in the rotation of the inner wheels as compared to the rotation of the outer wheels. At 808B, in response to determining that there is an imbalance in the rotation of each of the inner wheels ("No" at 808B) then at 812B processing circuitry determines if there is an imbalance in the rotation of the inner wheels as compared to the outer wheels.

Process 800B continues at 820B, where the processing circuitry determines that at least one of the outer wheels (outer front wheel and outer rear wheel) is rotating at a higher revolution rate than the other outer wheel. If the processing circuitry determines that there is an imbalance in the rotation of each of the outer wheels ("Yes" at 820B), then at 822B the processing circuitry adjusts (e.g., increasing or decreasing) the torque to each of the outer wheels (e.g., front outer wheel and rear outer wheel) to narrow the imbalance. Process 800B continues at 812B. At 820B, in response to determining that there is an imbalance in the rotation of each of the inner wheels ("No" at 820B) then at 812B processing circuitry determines if there is an imbalance in the rotation of the inner wheels as compared to the outer wheels.

If the processing circuitry determines that there is an imbalance in the rotation of the outer wheels and the inner wheel ("Yes" at 820B), then at 814B the processing circuitry adjusts (e.g., increasing or decreasing) the torque to each of the wheels (e.g., outer front wheel, outer rear wheel, inner front wheel, and inner rear wheel) to narrow the imbalance. At 812B, in response to determining that there is an imbalance in the rotation of each of the wheels ("No" at 812B) then 802B is repeated.

Figure 9:
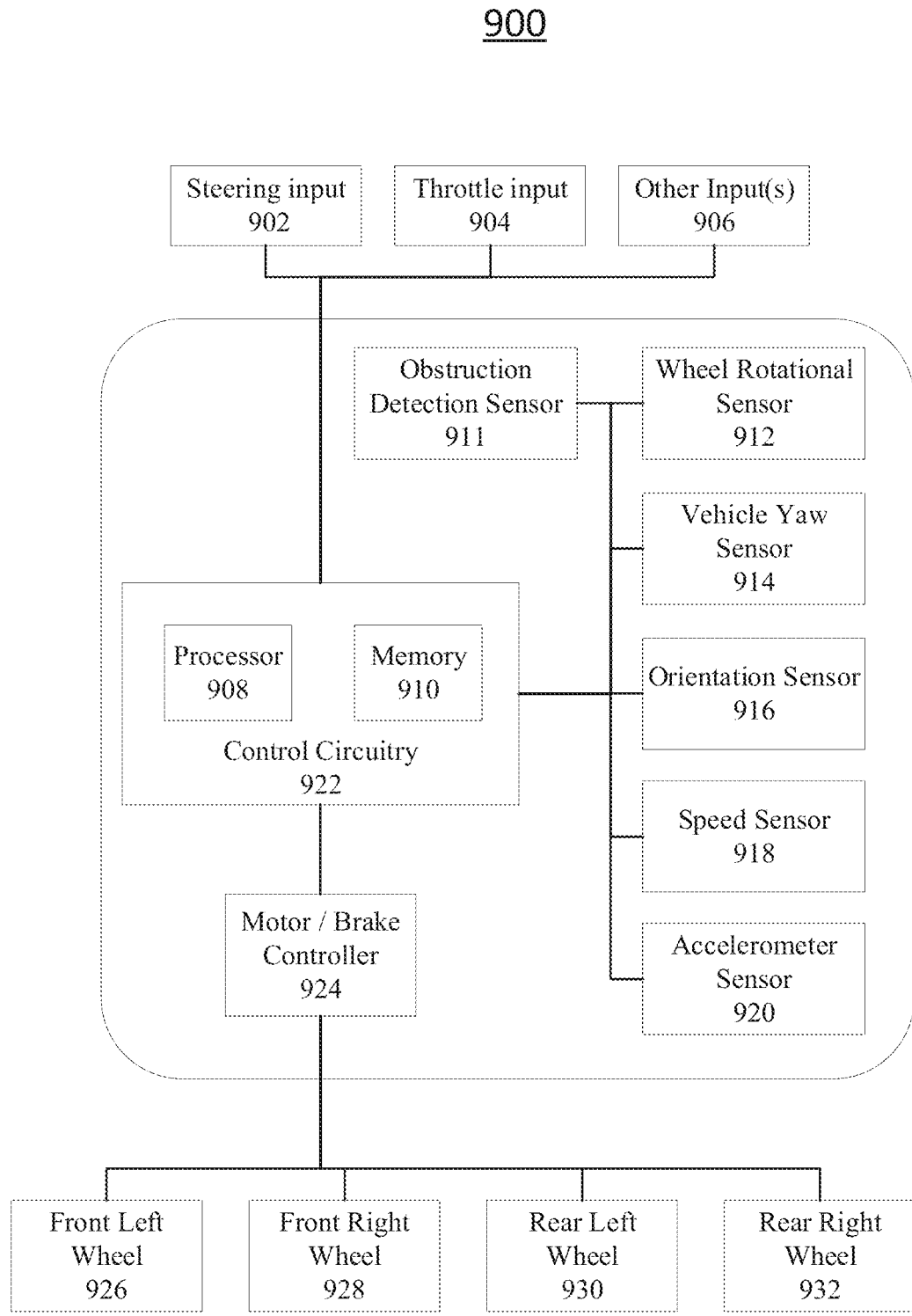
FIG. 9 depicts a system diagram of an illustrative system including processing circuitry, inputs variables, sensors and output variables, in accordance with some embodiments of the present disclosure.

FIG. 9 depicts a system diagram of an illustrative system 900 including control circuitry 922, inputs variables 902, 904, 906, sensors 911-920, motor brake controller 924 and output variables 926-932, in accordance with several embodiments of the disclosure. Illustrative control circuitry 922 includes processor 908, and memory 910.

Control circuitry 922 may include hardware, software, or both, implemented on one or more modules configured to provide control of front wheels and rear wheels of a vehicle. In some embodiments, processor 908 includes one or more microprocessors, microcontrollers, digital signal processors, programmable logic devices, field-programmable gate arrays (FPGAs), application-specific integrated circuits (ASICs), or any suitable combination thereof. In some embodiments, processor 908 is distributed across more than one processor or processing units. In some embodiments, control circuitry 922 executes instructions stored in memory for managing a quad motor vehicle 300, or a triple motor vehicle. In some embodiments, memory 910 is an electronic storage device that is part of control circuitry 922. For example, memory may be configured to store electronic data, computer instructions, applications, firmware, or any other suitable information. In some embodiments, memory 910 includes random-access memory, read-only memory, hard drives, optical drives, solid-state devices, or any other suitable memory storage devices, or any combination thereof. For example, memory may be used to launch a start-up routine.

In some embodiments, the system may include obstruction detection sensors 911, wheel rotation sensors 912, vehicle rotation sensors 914, orientation sensor 916, speed sensor 918, accelerometer sensor 920. In some embodiments, the control circuitry may be communicatively connected to one or more obstruction detection sensors 911 to monitor for obstructions around the vehicle. In some embodiments, the control circuitry may be communicatively connected to one or more wheel rotation sensors 912 that provide data indicative of the wheel rotation of each of wheels of the vehicle 202, 204, 206, 208. In some embodiments, based on the data provided by the wheel rotation sensor, the control circuitry may determine if a wheel is slipping and may apply corrective actions if necessary. In some embodiments, the control circuitry may be communicatively connected to one or more vehicle rotation sensors 914 that provide data indicative of the rotation of the vehicle. In some embodiments, the control circuitry may be communicatively connected to one or more orientation sensors 916 that provide data indicative of the orientation of vehicle 100 in 3D space. For example, orientation sensors 916 may provide data indicative of a pitch angle of vehicle 100, yaw angle of vehicle 100, and roll angle of vehicle 100. In some embodiments, the control circuitry may be communicatively connected to a speed sensor 918 that provides the current speed of vehicle 100. In some embodiments, the control circuitry may be communicatively connected to an accelerometer sensor 920 that provides the current acceleration of vehicle 100.

Illustrative system 900 of FIG. 9 may be used to perform any or all of the illustrative steps of processes 400, 500A, 500B, 600, 700A, 700B, 800A and 800B of FIGS. 4, 5A, 5B, 6, 7A, 7B, 8A, and 8B. Illustrative system 900 of FIG. 9 may be used to control any of the wheel/motor configurations shown in FIGS. 1 and 2, in accordance with the present disclosure. In some embodiments, not all components shown in FIG. 9 need be included in system 900.

It is contemplated that the steps or descriptions of each of FIGS. 1-8 may be used with any other embodiment of this disclosure. It is contemplated that some steps or descriptions of each of FIGS. 1-8 may be optional and may be omitted in some embodiments. In addition, the steps and descriptions described in relation to FIGS. 1-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 2 could be used to perform one or more of the steps in FIGS. 4-8.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within any vehicle 200.

The processes discussed above in connection with FIGS. 4-8 are intended to be illustrative and not limiting. One skilled in the art would appreciate that the steps of the processes in FIGS. 4-8 discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for controlling torque induced vehicle yaw in a vehicle, the method comprising:

while in a vehicle yaw mode:
providing forward torque to outer wheels of the vehicle;
providing backward torque to inner wheels of the vehicle;
monitoring rotation of each wheel;
monitoring a vehicle yaw rate; and
adjusting torque to the outer wheels and the inner wheels to maintain forward rotation of the outer wheels and rearward rotation of the inner wheels, based on each wheel's respective rotation and the vehicle yaw rate.

2. The method of claim 1, further comprising:
monitoring an incline of the vehicle based on a tilt sensor;
determining that the vehicle is in an inclined position or a banked position based on the incline of the vehicle, wherein
the inclined position includes front wheels of the vehicle being in a higher position than rear wheels or the rear wheels of the vehicle being in the higher position that the front wheels, and
the banked position includes outer wheels of the vehicle being in the higher position than the inner wheels or the inner wheels of the vehicle being in the higher position than the outer wheels;
comparing the incline of the vehicle against an incline vehicle threshold; and
in response to determining that the incline of the vehicle is below the incline vehicle threshold, initiating the vehicle yaw mode.

3. The method of claim 1, wherein the method further comprises:
monitoring an incline of the vehicle based on a tilt sensor;
determining that the vehicle is in an inclined position based on the incline of the vehicle; and
in response to determining that the vehicle is in the inclined position on an inclined surface, providing higher forward torques to the outer wheels rotating forward on the inclined surface than backward torques to the inner wheels rotating backward on the inclined surface.

4. The method of claim 3, further comprising:
while operating the vehicle in the inclined position:
the higher forward torques cause forward force components to be exerted on each wheel by a ground of the wheels rotating forward on the inclined surface; and
the backward torques cause rearward force components to be exerted on each wheel by the ground of the wheels rotating backward on the inclined surface,
wherein the forward force components are greater than the rearward force components.

5. The method of claim 1, further comprising:
monitoring an incline of the vehicle based on a tilt sensor;
determining that the vehicle is in a banked position based on the incline of the vehicle;
determining that the vehicle has rotated from the banked position to an inclined position; and
in response to determining that the vehicle has rotated, increasing forward torques to the outer wheels rotating forward on an inclined surface and decreasing backward torques to the inner wheels rotating backward on the inclined surface.

6. The method of claim 1, wherein when initiating the vehicle yaw mode:

providing the forward torque to the outer wheels comprises ramping the forward torque to a predetermined amount; and
providing the backward torque to the inner wheels comprises ramping the backward torque to the predetermined amount.

7. The method of claim 1, wherein when initiating the vehicle yaw mode:
providing the forward torque to the outer wheels comprises increasing the forward torque incrementally in a stepwise pattern; and
providing the backward torque to the inner wheels comprises increasing the backward torque incrementally in the stepwise pattern,
wherein an increase in the stepwise pattern is selected from one of 100 Nm, 200 Nm, 300 Nm, 400 Nm, 500 Nm, 600 Nm, 700 Nm, 800 Nm, 900 Nm, 1000 Nm, 1500 Nm, 2000 Nm or any combination thereof.

8. The method of claim 1, further comprising:
monitoring for obstructions around the vehicle based on one or more obstruction sensors disposed on the vehicle;
determining an obstruction based on the one or more obstruction sensors; and
in response to determining the obstruction, disengaging the vehicle yaw mode.

9. The method of claim 1, wherein the method further comprises:
while operating in the vehicle yaw mode, controlling the forward torque to each wheel of the outer wheels and the backward torque to each wheel of the inner wheels, such that each wheel of the vehicle maintains slippage while the vehicle rotates about a substantially static location.

10. The method of claim 1, wherein the method further comprises:
comparing the rotation for each wheel of the vehicle to a target spin rate; and
adjusting the forward torque to each wheel of the outer wheels and the backward torque to each wheel of the inner wheels based on the comparing.

11. The method of claim 1, wherein the method further comprises:
determining the vehicle yaw rate based on a vehicle yaw rate sensor;
comparing the vehicle yaw rate to a target vehicle yaw rate; and
adjusting the forward torque to each wheel of the outer wheels and the backward torque to each wheel of the inner wheels to control the vehicle yaw rate based on the comparing.

12. The method of claim 1, wherein:
forward torques cause forward force components to be exerted on each wheel by a ground of the outer wheels;
backward torques cause rearward force components to be exerted on each wheel by the ground of the inner wheels; and
a combination of the forward force components and rearward force components results in the vehicle yaw rate.

13. The method of claim 1, wherein:
providing the forward torque to the outer wheels of the vehicle comprises a first motor configured to transmit torque to an outer front wheel and a second motor configured to transmit torque to an outer rear wheel; and providing the backward torque to the inner wheels of the vehicle comprises a third motor configured to transmit torque to an inner front wheel and a fourth motor configured to transmit torque to an inner rear wheel.

14. The method of claim 1, wherein adjusting the torque to the outer wheels and the inner wheels to maintain forward rotation of the outer wheels and rearward rotation of the inner wheels comprises adjusting forward torque to each wheel of the outer wheels and backward torque to each wheel of the inner wheels to maintain slippage of the outer wheels in a forward direction and the inner wheels in a rearward direction.

15. A vehicle configured for controlling torque induced vehicle yaw, the vehicle comprising:
front wheels;
rear wheels;
each wheel of the front wheels and the rear wheels is configured with a motor configured to provide torque to a respective wheel; and
control circuitry configured to:
while in a vehicle yaw mode:
provide forward torque to outer wheels of the vehicle;
provide backward torque to inner wheels of the vehicle;
monitor rotation of each wheel;
monitor a vehicle yaw rate; and
adjust torque to the outer wheels and the inner wheels to maintain forward rotation of the outer wheels and rearward rotation of the inner wheels, based on each wheel's respective rotation and the vehicle yaw rate.

16. The vehicle of claim 15, wherein the control circuitry is further configured to:
monitor an incline of the vehicle based on a tilt sensor;
determine that the vehicle is in an inclined position or a banked position based on the incline of the vehicle, wherein
the inclined position includes the front wheels of the vehicle being in a higher position than the rear wheels or the rear wheels of the vehicle being in the higher position that the front wheels, and
the banked position includes outer wheels of the vehicle being in the higher position than the inner wheels or the inner wheels of the vehicle being in the higher position than the outer wheels;
compare the incline of the vehicle against an incline vehicle threshold; and
in response to determining that the incline of the vehicle is below the incline vehicle threshold, initiate the vehicle yaw mode.

17. The vehicle of claim 15, wherein the control circuitry is further configured to:
monitor an incline of the vehicle based on a tilt sensor;
determine that the vehicle is in a banked position based on the incline of the vehicle;
determine that the vehicle has rotated from the banked position to an inclined position; and
in response to determining that the vehicle has rotated, increasing forward torques to the outer wheels rotating forward on an inclined surface and decreasing backward torques to the inner wheels rotating backward on the inclined surface.

18. The vehicle of claim 15,
wherein the control circuitry is further configured to:
monitor an incline of the vehicle based on a tilt sensor;

determine that the vehicle is in an inclined position based on the incline of the vehicle; and in response to determining that the vehicle is in the inclined position on an inclined surface, provide higher forward torques to the outer wheels rotating forward on the inclined surface than backward torques to the inner wheels rotating backward on the inclined surface.

19. The vehicle of claim 18, wherein while operating the vehicle in the inclined position:

the higher forward torques cause forward force components to be exerted by each wheel on a ground of wheels rotating forward on the inclined surface; and the backward torques cause rearward force components to be exerted by each wheel on the ground of wheels rotating backward on the inclined surface, and wherein the forward force components are greater than the rearward force components.

20. The vehicle of claim 15, wherein the control circuitry is further configured, when adjusting the torque to the outer wheels and the inner wheels to maintain forward rotation of the outer wheels and rearward rotation of the inner wheels, to adjust forward torque to each wheel of the outer wheels and backward torque to each wheel of the inner wheels to maintain slippage of the outer wheels in a forward direction and the inner wheels in a rearward direction.

* * * * *